US011685056B2

(12) United States Patent
Williams

(10) Patent No.: US 11,685,056 B2
(45) Date of Patent: Jun. 27, 2023

(54) AUTONOMOUSLY ENCAPSULATING GRIPPER TOOLING

(71) Applicant: PHD, Inc., Fort Wayne, IN (US)

(72) Inventor: Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 17/683,756

(22) Filed: Mar. 1, 2022

(65) Prior Publication Data

US 2022/0234214 A1 Jul. 28, 2022

Related U.S. Application Data

(63) Continuation of application No. 16/430,724, filed on Jun. 4, 2019, now Pat. No. 11,312,022.

(Continued)

(51) Int. Cl.
*B25J 15/00* (2006.01)
*B25J 15/02* (2006.01)
*B25J 15/10* (2006.01)

(52) U.S. Cl.
CPC ....... *B25J 15/0009* (2013.01); *B25J 15/0233* (2013.01); *B25J 15/0253* (2013.01); *B25J 15/10* (2013.01)

(58) Field of Classification Search
CPC .... B25J 15/0009; B25J 15/0233; B25J 15/10; B25J 15/103

(Continued)

(56) References Cited

U.S. PATENT DOCUMENTS

| 2,545,452 A | 3/1951 | Fletcher |
|---|---|---|
| 3,694,021 A | 9/1972 | Mullen |

(Continued)

FOREIGN PATENT DOCUMENTS

| CN | 101518903 A | 9/2009 |
|---|---|---|
| JP | 2001-277174 A | 10/2001 |
| WO | 2017/116614 A2 | 7/2017 |

OTHER PUBLICATIONS

Extended European Search Report dated Feb. 15, 2022 for European Patent Application No. 19814924.7 (10 pages).

(Continued)

*Primary Examiner* — Dean J Kramer
(74) *Attorney, Agent, or Firm* — Taylor IP, P.C.

(57) ABSTRACT

A gripper tooling includes: a gripper having a gripper body and an angular jaw; a rotor fixedly connected to the angular jaw; and a tooling member for gripping a workpiece, the tooling member including: a base pivotally connected to the rotor; a middle segment pivotally connected to the base; a distal segment pivotally connected to the middle segment; an adducting tendon having a proximal end attached to the rotor and a distal end attached to the distal segment, the rotor for rotating relative to the base and thereby for tensioning the adducting tendon; and an abducting tendon having a proximal end attached to the base and a distal end attached to the distal segment such that the tooling member can autonomously grip the workpiece as the angular jaw rotates toward the workpiece and the tooling member autonomously returns to an ungripped position as the angular jaw rotates away from workpiece.

12 Claims, 17 Drawing Sheets

Related U.S. Application Data

(60) Provisional application No. 62/682,471, filed on Jun. 8, 2018.

(58) Field of Classification Search
USPC .......................................................... 294/111
See application file for complete search history.

(56) References Cited

U.S. PATENT DOCUMENTS

| | | | |
|---|---|---|---|
| 4,185,866 | A | 1/1980 | Wittwer |
| 5,092,646 | A | 3/1992 | Smallridge |
| 5,647,723 | A | 7/1997 | Rush |
| 6,505,870 | B1 | 1/2003 | Lalibertéet al. |
| 6,874,834 | B2 | 4/2005 | McIntosh et al. |
| 8,424,942 | B2 | 4/2013 | Park et al. |
| 8,757,690 | B2 | 6/2014 | Gao et al. |
| 8,905,452 | B2 | 12/2014 | Williams et al. |
| 8,936,289 | B1 | 1/2015 | Kozlowski et al. |
| 8,973,958 | B2 | 3/2015 | Allen Demers et al. |
| 8,979,152 | B2 | 3/2015 | Ciocarlie et al. |
| 9,585,771 | B2 | 3/2017 | Baba et al. |
| 9,914,214 | B1 | 3/2018 | Strauss et al. |
| 11,285,617 | B2 * | 3/2022 | Williams ................. B25J 9/104 |
| 11,312,022 | B2 * | 4/2022 | Williams ............. B25J 15/0009 |
| 2003/0090115 | A1 | 5/2003 | Kim et al. |
| 2005/0121929 | A1 | 6/2005 | Greenhill et al. |
| 2014/0007730 | A1 | 1/2014 | DeLouis |
| 2014/0035306 | A1 | 2/2014 | Garcia et al. |
| 2017/0252930 | A1 | 9/2017 | Birglen |

OTHER PUBLICATIONS

Che et. al.; "Active Gesture-Changeable Underactuacted Finger for Humanoid Robot Hand Based on Multiple Tendons"; presented at the IFToMM/ASME International Workshop on Underactuated Grasping (UG2010); Aug. 19, 2010; Montreal, Canada.

Wang et al.; "A Highly-Underactuated Robotic Hand with Force and Joint Angle Sensors"; 2011 IEEE/RSJ International Conference on Intelligent Robots and Systems; Sep. 25-30, 2011; San Francisco, CA, USA.

Notification of Transmittal of the International Search Report and the Written Opinion of the International Searching Authority, or the Declaration dated Sep. 25, 2019 for International Patent Application No. PCT/US2019/035390 (14 pages).

\* cited by examiner

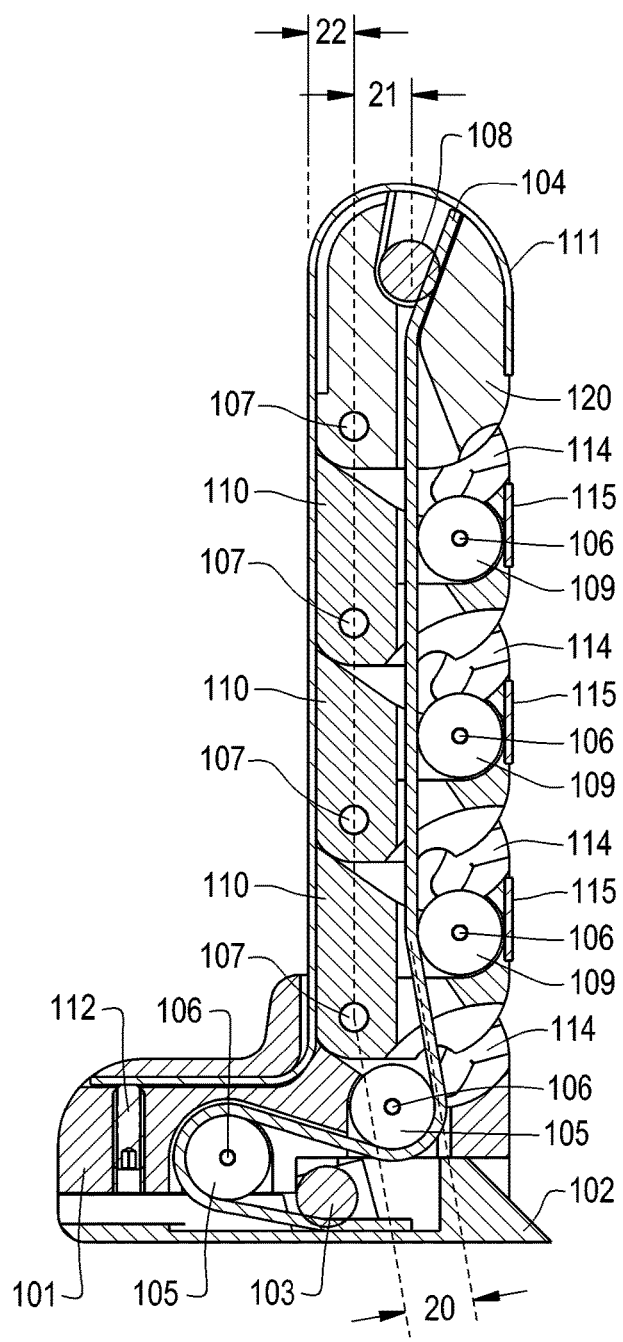
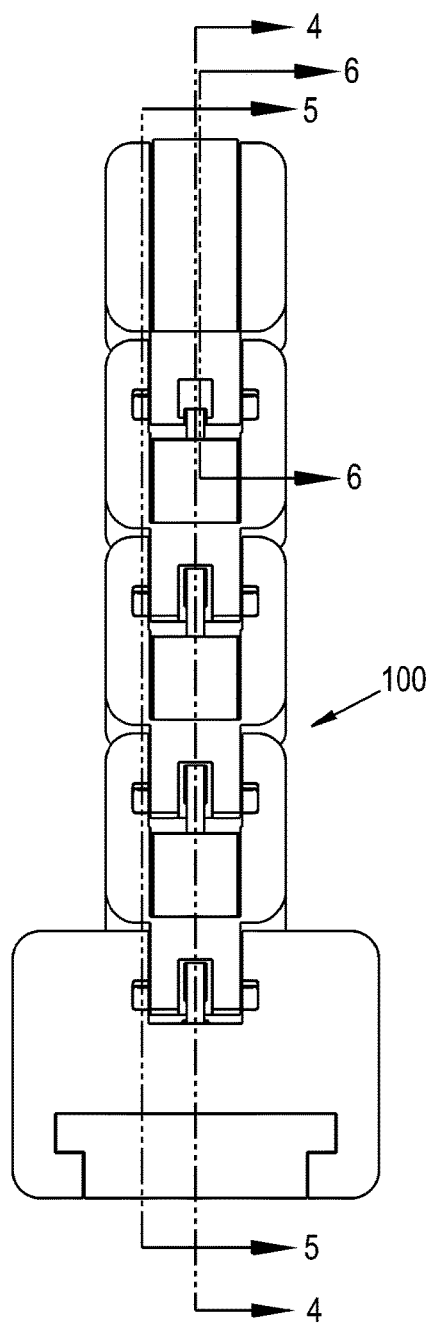
FIG. 4
FIG. 3

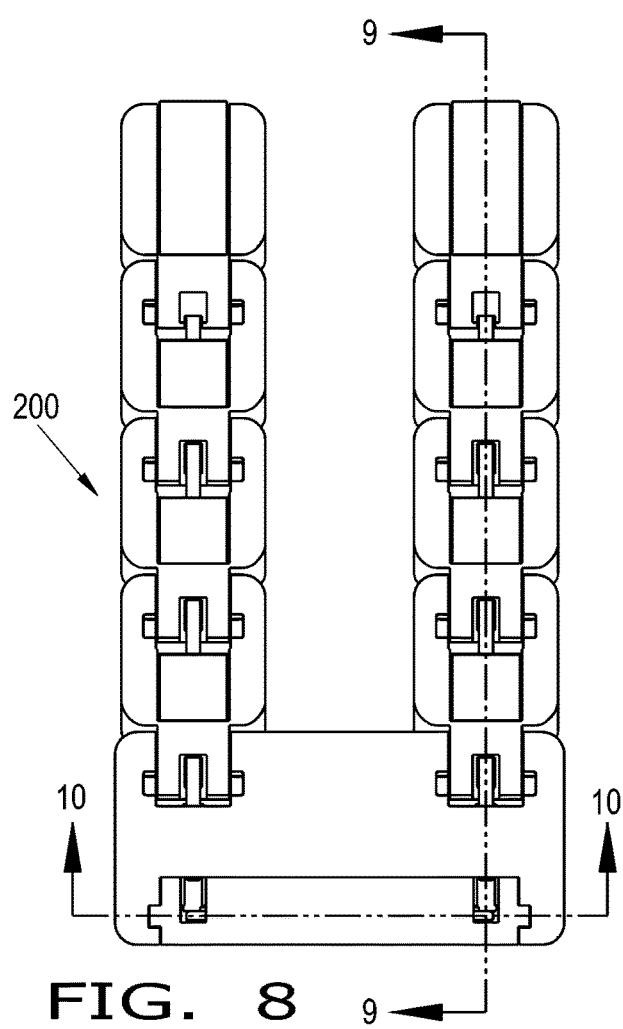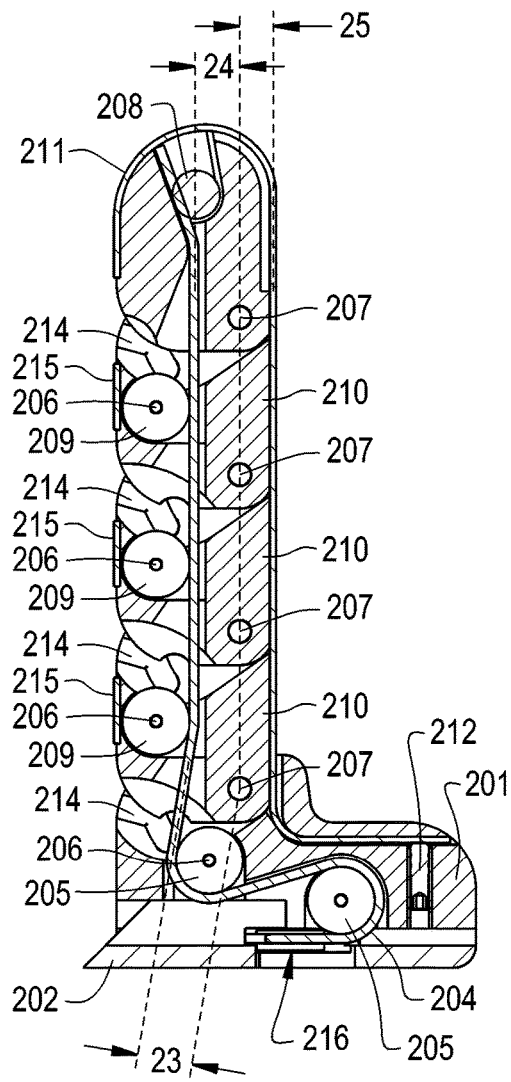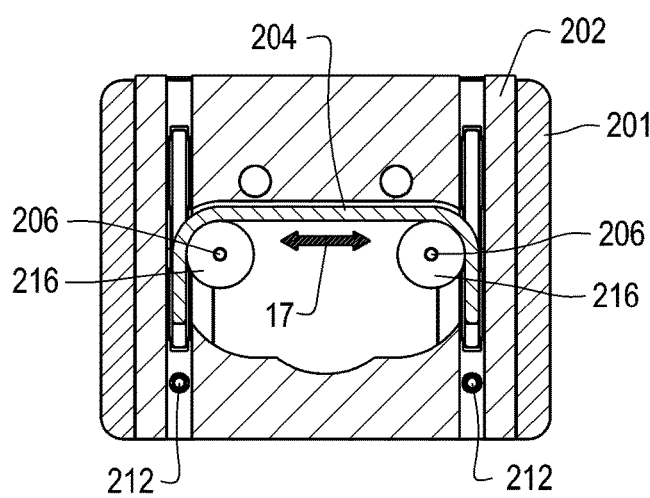

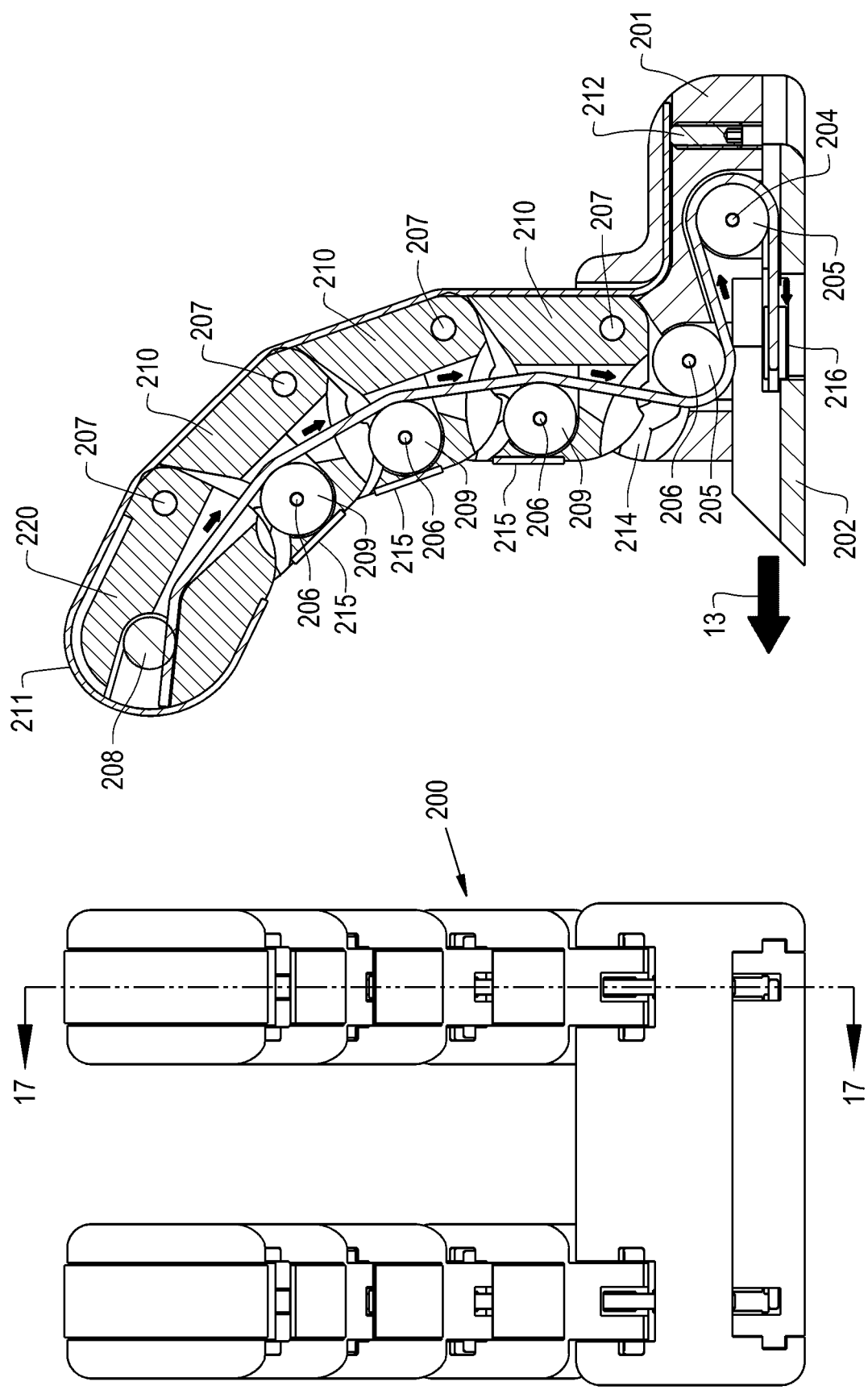

AUTONOMOUSLY ENCAPSULATING GRIPPER TOOLING

CROSS REFERENCE TO RELATED APPLICATIONS

This is a continuation of U.S. patent application Ser. No. 16/430,724, entitled "AUTONOMOUSLY ENCAPSULATING GRIPPER TOOLING", filed Jun. 4, 2019, which is incorporated herein by reference. U.S. patent application Ser. No. 16/430,724 is a non-provisional application based upon U.S. provisional patent application Ser. No. 62/682,471, entitled "AUTONOMOUSLY ENCAPSULATING GRIPPER TOOLING", filed Jun. 8, 2018, which is incorporated herein by reference.

BACKGROUND OF THE INVENTION

1. Field of the Invention

The present invention relates to gripper tooling, and, more particularly, to self-articulating grippers.

2. Description of the Related Art

Grippers are mechanical devices which generally include jaws that are moved together or apart by motive devices, such as electric motors or pneumatic pistons. Tooling is typically fastened to the jaw to provide some degree of conformal contact between the surface of the tool and one or more surfaces of a gripped workpiece. Once the jaws have moved the fastened tooling into a position of contact with the gripped workpiece, the jaws produce a force against the tooling which is transferred by the tooling to retain the workpiece so that the position of the workpiece might be subsequently translated or rotated. It is often desirable that the tooling fully or partially encapsulate the profile of the workpiece to prevent relative motion from occurring between the workpiece and tooling as the workpiece is subsequently translated or rotated or external forces are applied to the workpiece.

It is known in the art to construct the tooling with a complimentary contacting surface profile which corresponds to the profile of the work-piece to better encapsulate a gripped workpiece. This method of encapsulation typically renders the tooling suitable for gripping only a single shape of workpiece or a series of similarly shaped workpieces that share a common surface profile. Generally, tooling must be removed and replaced if a noncompatible shape of workpiece is to be subsequently gripped, resulting in an undesirable increase in downtime and reduced throughput for the manufacturing or material handing operation of which the gripper is a part.

What is needed in the art is a cost-effective gripper for automatically accommodating the shape of the workpiece and gripping the workpiece.

SUMMARY OF THE INVENTION

The present invention provides a gripper tooling capable of autonomously adjusting to conform to the gripped profile of the workpiece, so as to encapsulate a broad spectrum of shapes and sizes of workpieces. The gripper tooling furthermore derives the motive force necessary to adjust solely from the motion of the gripper jaws to which the tooling is attached. This manner of force derivation simplifies the connection between the tooling and the gripper as the tooling need only to be mechanically fastened to the gripper in order to operate as desired. Such manner of simple attachment allows the tooling to be used with numerous types of commercial grippers by only changing the mounting pattern of the tooling to match the pattern of the gripper jaws.

The invention in one form is directed to a gripper tooling including a gripper having a gripper body and at least one jaw connected and linearly sliding relative to the gripper body, at least one slider connected to the at least one jaw, and at least one tooling member configured for gripping a workpiece. Each tooling member including a base slideably mounted to the at least one slider, at least one middle segment pivotally connected to the base, a distal segment pivotally connected to the at least one middle segment, an adducting tendon having a proximal end attached to the at least one slider and a distal end attached to the distal segment, and an abducting tendon having a proximal end attached to the base and a distal end attached to the distal segment. The at least one tooling member is configured for autonomously gripping the workpiece as the at least one jaw moves toward the workpiece and the at least one tooling member autonomously returns to an ungripped position as the at least one jaw moves away from the workpiece.

The invention in another form is directed to a gripper tooling including a gripper having a gripper body and at least one angular jaw, at least one rotor rotatably connected to the at least one angular jaw, and at least one tooling member configured for gripping a workpiece. Each tooling member including a base pivotally connected to the at least one rotor, at least one middle segment pivotally connected to the base, a distal segment pivotally connected to the at least one middle segment, an adducting tendon having a proximal end attached to the at least one rotor and a distal end attached to the distal segment, and an abducting tendon having a proximal end attached to the base and a distal end attached to the distal segment. The at least one tooling member is configured for autonomously gripping the workpiece as the at least one angular jaw rotates toward the workpiece and the at least one tooling member autonomously returns to an ungripped position as the at least one angular jaw rotates away from the workpiece.

The invention in yet another form is directed to a method for gripping a workpiece including a step of providing a gripper tooling including a gripper having a gripper body and at least one jaw moveably connected to the gripper body, at least one mount moveably connected to the at least one jaw, and at least one tooling member configured for gripping the workpiece, each tooling member including a base moveably mounted to the at least one mount, at least one middle segment pivotally connected to the base, a distal segment pivotally connected to the at least one middle segment, an adducting tendon having a proximal end attached to the at least one mount and a distal end attached to the distal segment, and an abducting tendon having a proximal end attached to the base and a distal end attached to the distal segment. The method also includes the steps of gripping the workpiece by the adducting tendon upon moving the base, by the at least one jaw, to be immobilized by the workpiece, and ungripping the workpiece by the abducting tendon upon moving the base, by the at least one jaw, away from the workpiece.

An advantage of the present invention is that the gripper tooling fingers self-articulate, via the usual operational motion of the gripper jaws, to autonomously encapsulate a plethora of differently-shaped workpieces.

Another advantage of the present invention is that the self-articulating gripper tooling fingers can be easily and efficiently attached to numerous types of gripper jaws by only changing the mounting pattern of the gripper tooling fingers to match the mounting pattern of the gripper jaws.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein

FIG. 3 is a front view of the left tooling member of FIG. 1;

FIG. 4 is a cross-sectional view of the left tooling member, taken across line 4-4 in FIG. 3;

FIG. 8 is a front view of the right tooling member;

FIG. 9 is a cross-sectional view of the right tooling member, taken across line 9-9 in FIG. 8;

FIG. 10 is a cross-sectional view illustrating the underside of the right tooling member, taken across line 10-10 in FIG. 8;

FIG. 16 is a front view of the right tooling member in the encapsulated position;

FIG. 17 is a cross-sectional view of the right tooling member in the encapsulated position, taken across line 17-17 in FIG. 16;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
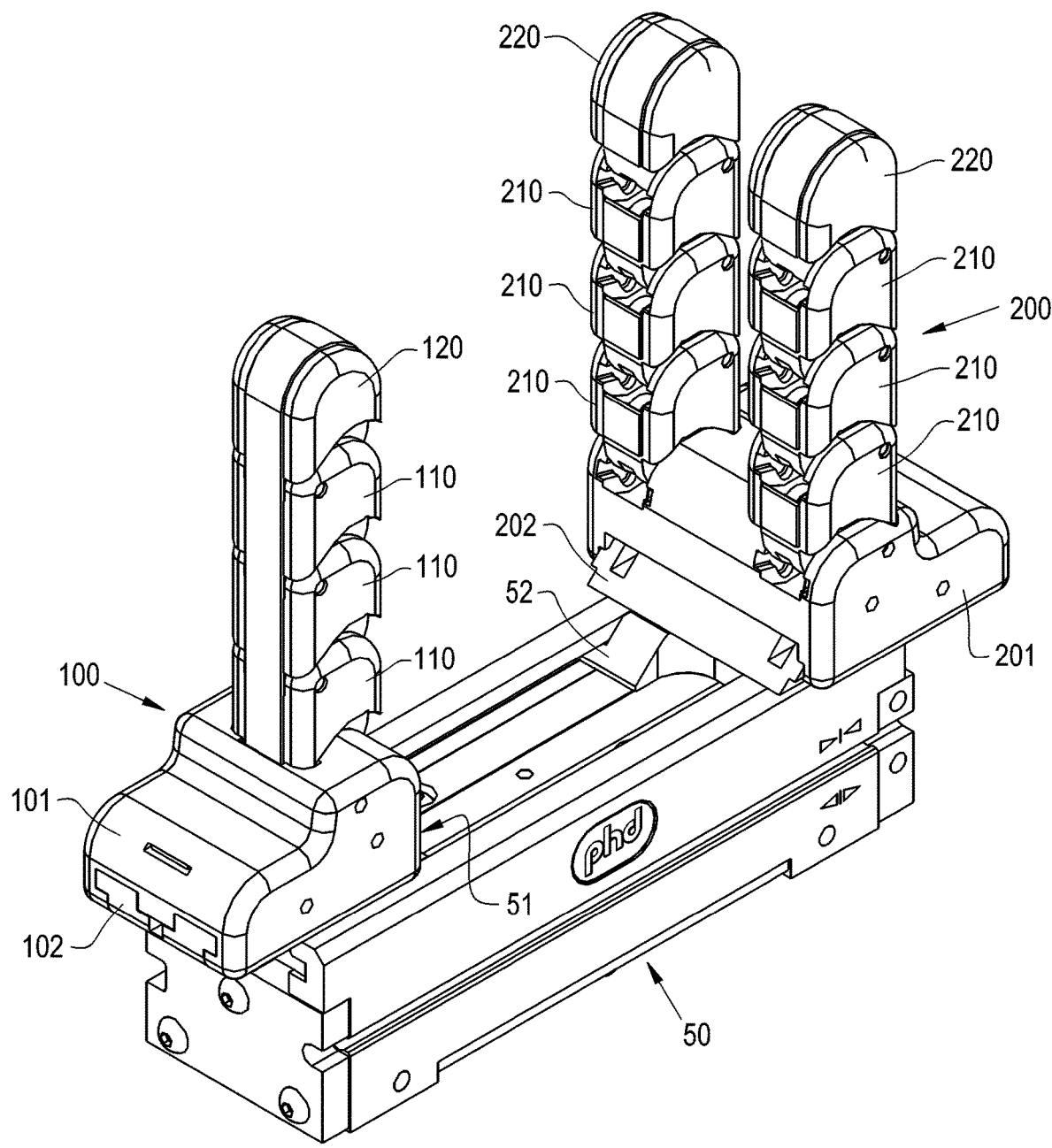
FIG. 1 is a perspective view of an embodiment of a gripper tooling having left and right tooling members according to the present invention.

Referring now to the drawings, and more particularly to FIG. 1, there is shown one embodiment of the gripper tooling mounted to an illustrative gripper with parallel jaw travel 50, such as the GRH series gripper manufactured by the PHD Corporation. Left tooling member 100 consists of a single gripper "finger" including a base 101 to which is attached a chain of multiple identical articulated segments 110, capped by an articulated distal segment 120. A slider 102 attaches left tooling member 100 to the left jaw 51 of gripper 50 with threaded fasteners (not shown, see also FIG. 11). Right tooling member 200 consists of a base 201 to which is attached two gripper fingers comprising multiple identical articulated segments 210, capped by identical articulated distal segments 220. A slider 202 attaches right tooling member 200 to the right jaw 52 of gripper 50 with threaded fasteners (not shown). Although the embodiment illustrates similar finger construction for the left and right fingers, it will be understood by one skilled in the art that the articulated segments comprising the left and right fingers can also differ in quantity, overall dimensions, construction, and physical arrangement from those illustrated. It is also understood that left and right fingers need not be of similar construction to one another and that the quantity of fingers present on each tooling member can be varied without affecting the fundamental nature of the invention.

Referring now to FIGS. 2-6, there is shown the left tooling member 100. Ribs protruding from the sides of slider 102 are disposed into complementary slots in the base 101 so as to prevent the rotation of the base 101 with respect to the slider and limit the translation of the base 101 in all directions except along the longitudinal axis of slider 102. A bevel on the forward edge of slider 102 acts to lift any portion of the workpiece that the slider may contact out of the path of the slider as the slider, mechanically fastened to the left jaw 51 of gripper 50, moves towards the workpiece.

The left tooling member 100 may include an adducting tendon 104 having a proximal end connected to the slider 102 and a distal end connected to the distal segment 120. The adducting tendon 104 may be in the form of a cable 104. A lower knurled cylindrical cleat 103 may mechanically fasten the proximal end of the cable 104 to the slider 102. However, in addition or alternatively to such mechanical attachment, the cable 104 may be attached with a suitable adhesive applied between the cable 104 and the slider 102. The cable 104 may be composed of any desired material. In one embodiment, the cable 104 is a polymer cable which offers the advantages over traditional steel cable of improved resistance to fatigue and corrosion, greater flexibility, improved dissipation of mechanical shock, and lower cost.

A set of pulleys 105, supported by pivot pins 106 pressed into complimentary holes in body 101, route the motion of cable 104 so that as the proximal end of the cable 104 is pulled by the motion of slider 102 relative to body 101, cable 104 is drawn through the central passages of articulated segments 110. Although pulleys 105 are shown as being directly supported by pivot pins 106, it is understood that a suitable commercial bearing bushing, radial ball bearing, or needle bearing could be interposed between the pulley and pin when the size of pulley 105 is sufficiently large to allow doing so.

Pivot pins 107 pass though complimentary holes in base 101 and segments 110 and 120 to attach common segments 110 to base 101, to each other, and to distal segment 120, forming a chain of pinned articulated segments radiating outwards from base 101. Although segments 110 and segment 120 are shown as being directly supported by pivot pins 107, it is understood that a suitable commercial bearing bushing, radial ball bearing, or needle bearing could be interposed between the pivot hole in the segments and pin 107 when the size of segment is sufficiently large to allow doing so.

The upper, distal end of the cable 104 may be mechanically fastened to the distal segment 120 with an upper knurled cylindrical cleat 108. It is understood that such mechanical attachment could also be affected with a suitable adhesive applied between the cable 104 and the segment 120. Cable 104 passes over pulleys 109 disposed within each identical segment 110. In this manner, cable 104, suitably attached between slider 102 and distal segment 120, effectively forms the taut adducting tendon 104 located on one side of segment pivot pins 107. Although pulleys 109 are shown as being directly supported by pivot pins 106 pressed into complimentary holes in segments 110, it is understood that a suitable commercial bearing bushing, radial ball bearing, or needle bearing could be interposed between the pulley and pin when the size of pulley 109 is sufficiently large to allow doing so.

The left tooling member 100 may include an abducting tendon 111. An external strip 111 may effectively form the abducting tendon 111, which is located on the opposing side of pivot pins 107. The external strip 111 may be composed of a suitable elastomeric material. The distal end of the strip 111 is attached in any desired way, such as thermal or adhesive bonding, into a complimentary groove in distal segment 120. The proximal end of elastomeric strip 111 is disposed within a complementary slot in body 101 and is attached to body 101 by the clamping action of set-screw 112 or by other suitable thermal or adhesive bonding. The portion of strip 111 between the distal and proximal attached ends is unconstrained and free to stretch or relax. The strip 111 is stretched during installation to create a tension in the strip 111 which acts to pull distal segment 120 toward base 101. This pull induces a torque in distal segment 120 and common segments 110 which acts to rotate each segment counterclockwise (CCW) with respect to pivot pins 107. It should be understood by one skilled in the art that strip 111 could be replaced by one or more helical extension springs or a flexible, but non-stretchable tensile member attached to a suitable spring to provide the same function as an elastomeric strip.

Bosses 113, protruding from the sides of common segments 110, engage complimentary slots 114, in body 101 and segments 110 to constrain the angle of CCW rotation of the segment pinned to base 101 and each successive pinned segment in the segment chain, relative to the prior segment. Thusly constrained by the action of bosses 113 within slots 114, the segments cannot rotate CCW about pivots 107 beyond a position in which the segments are in a straight, vertical alignment with one another.

Clockwise (CW) rotation of any segment under the influence of an external torque causes additional stretching of strip 111, with a resulting increase in the torque applied by the strip to the CW rotated segment in this manner, strip 111 functions as an abducting tendon which constantly applies a torque to segments 110 and 120 about pivot pin 107 to restore the segments into straight vertical alignment with one another. Downward motion of adductor cable 104 through the central passages of segments 110 induces a CW torque in segments 110 and 120 that causes the segments to rotate CW about pivot pins 107, further stretching abductor strip 111.

Pads 115 are suitably bonded into complimentary recesses in segments 110. Pads 115 are constructed of a material such as a suitable elastomer or a nanodiamond impregnated metal substrate, possessing a high coefficient of static friction, so as to enhance the frictional forces generated between the pad and any surface of the gripped workpiece that the pad might contact.

Dimension 20 indicates the orthogonal distance between the center of pivot pin 107 connecting the proximal most common segment 110 to base 101 and the centerline of adductor cable 104. Dimension 21 indicates the orthogonal distance between the respective pivot pins 107 of the remaining segments and the centerline of cable 104. Dimension 22 indicates the orthogonal distance between the pivot pins 107 of the remaining segments and the centerline of abductor strip 111. The CW acting torque about pivot pins 107 applied to the various segments by the tension in adductor cable 104 is equal to the product of the tension in the cable and the orthogonal distance between the respective pivot pin and the centerline of the adductor cable 104 in an analogous manner, the CCW acting torque about pivot pins 107 applied to the various segments by the tension in abductor strip 111 is equal to the product of the tension in the strip and the orthogonal distance between the respective pivot pin and the centerline of the abductor strip. It will be evident to one skilled in the art that as the tension in cable 104 when pulled upon is constant along the entire length of the cable, only the orthogonal distance between the center of the respective pivot pin 107 and cable centerline needs be varied to control the torque applied by cable 104 to any given segment. It will also be evident that the local tension in abductor strip 111 is a function of the cross-sectional area of the strip at that locality, so that the local tension in the strip can be controlled by selectively varying the cross-sectional area of strip 111 along the length of the strip. Therefore, the net torque acting on any given segment can be chosen by controlling the local cross-sectional area of strip 111, the distance between the respective pivot pin 107 of the segment and the centerline of abductor strip 111, and the distance between the respective pivot pin 107 of the segment and the centerline of adductor cable 104. It will also be evident that in the absence of any external torques acting upon the segments, the segment with the greatest net applied CW torque will rotate toward the workpiece first, with each remaining segment successively rotating in descending order of net applied CW torque.

Figure 2:
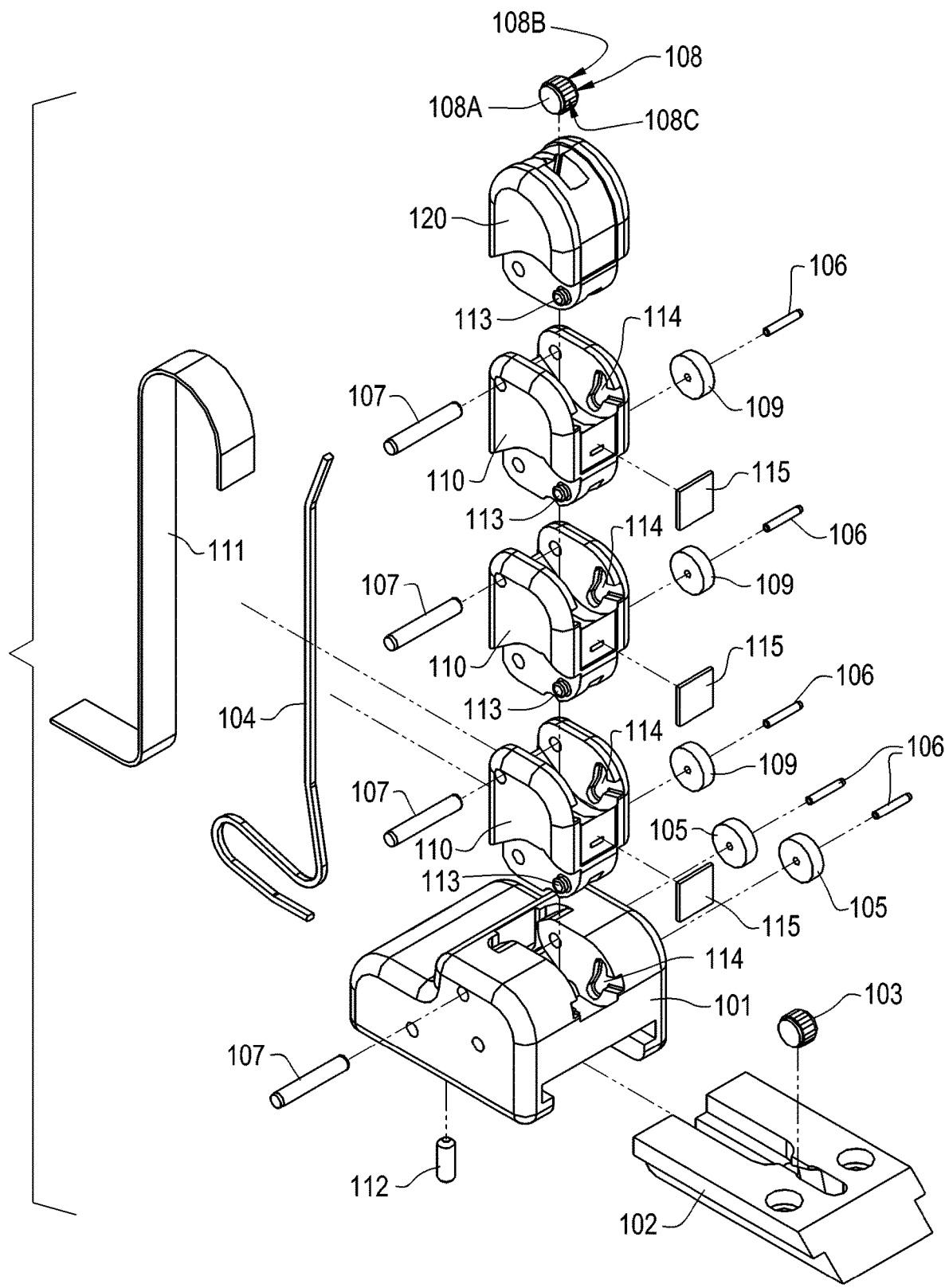
FIG. 2 is an exploded view of the left tooling member of FIG. 1.
Figure 5:
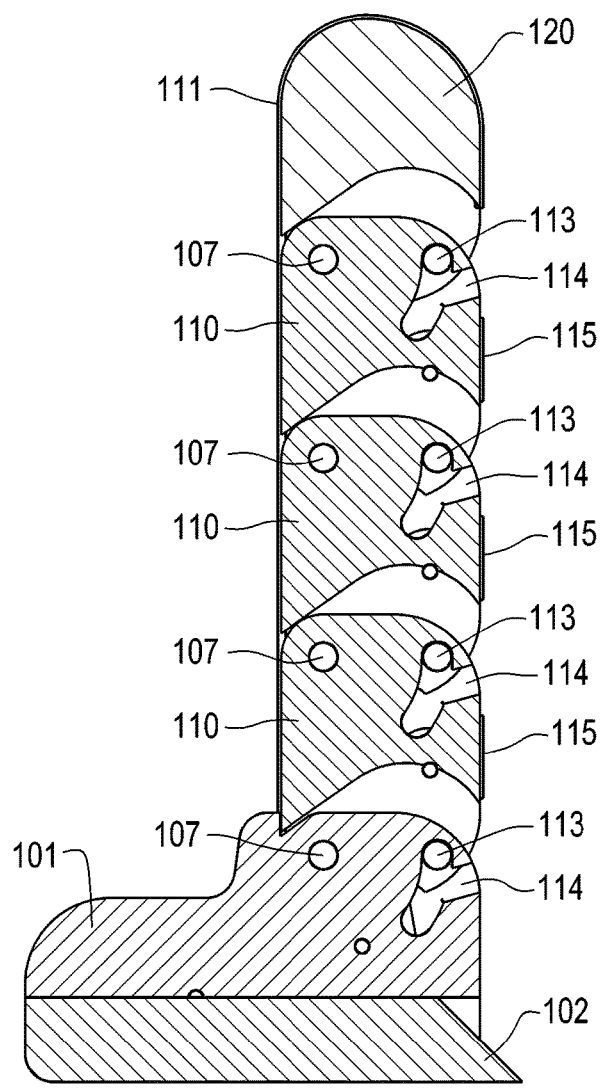
FIG. 5 is a cross-sectional view of the left tooling member, taken across line 5-5 in FIG. 3.

The cleat 108 mechanically fastens the distal end of adductor cable 104 to distal segment 120. Cleat 108 is comprised of central cylinder 108C the outer diameter of which receives a straight knurl or other friction enhancing treatment such as a nanodiamond impregnated plating. Bosses 108A and 108B flank central cylinder 108C (FIG. 2).

Figure 6:
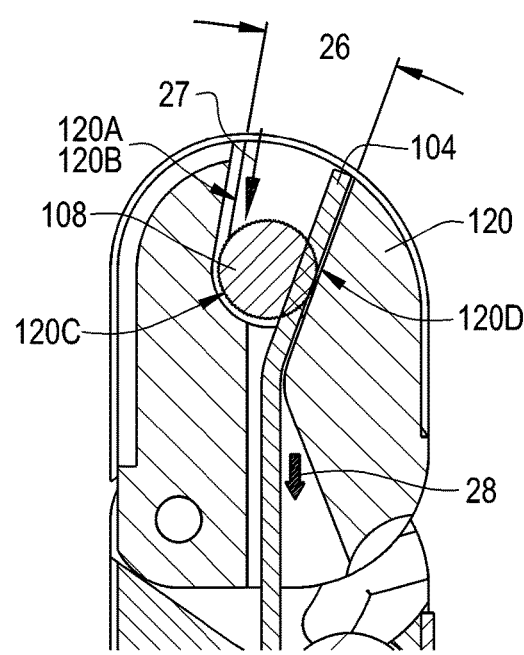
FIG. 6 is a cross-sectional view of the top of the left tooling member, taken across line 6-6 in FIG. 3.
Figure 7:
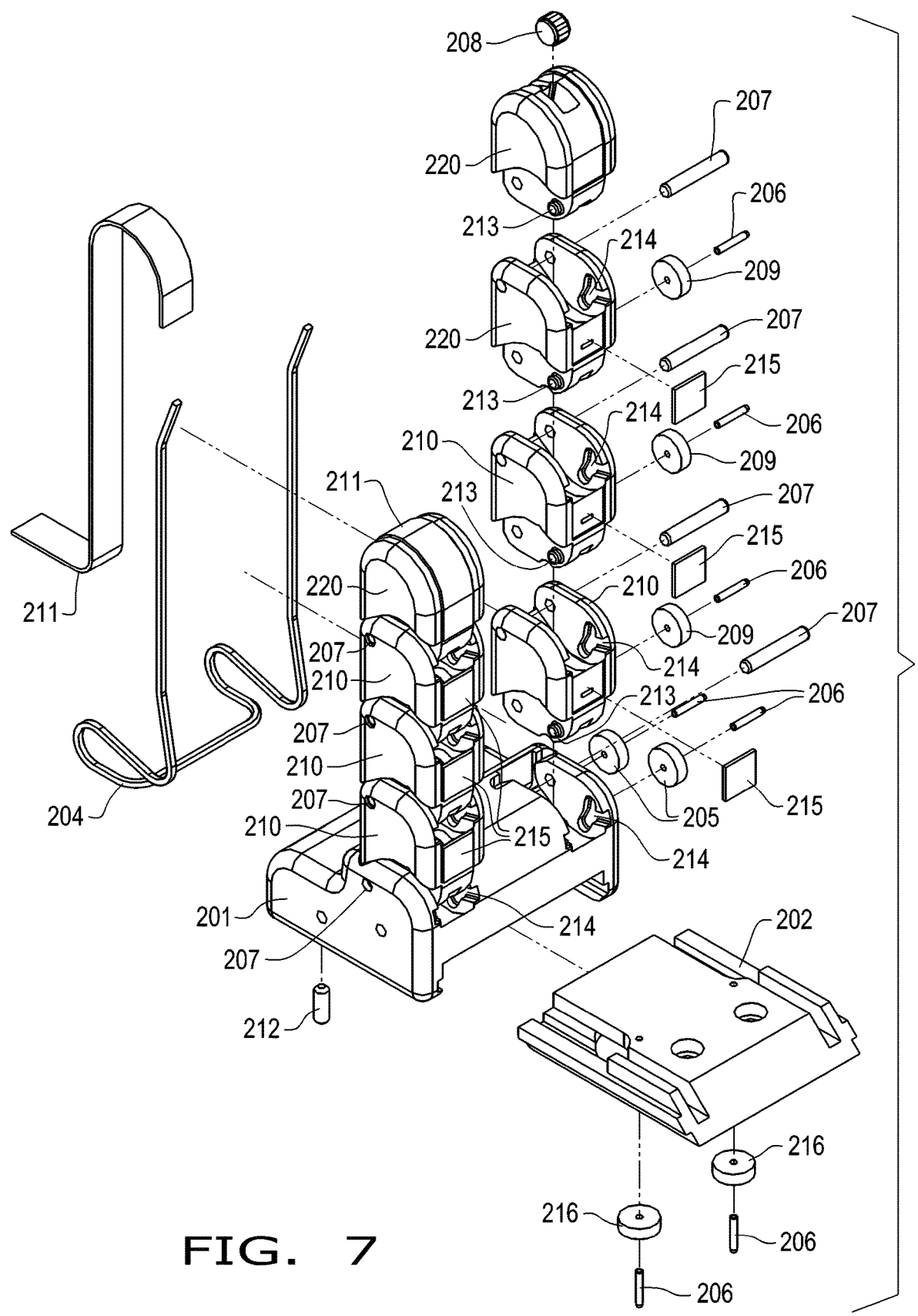
FIG. 7 is an exploded view of the right tooling member of the gripper tooling of FIG. 1.

After installation of the cleat 108 into distal segment 120, the surface of boss 108A rests against complimentary surface 120A in the cleat cavity within segment 120, while the surface of boss 108B similarly rests against complimentary surface 120B. A complimentary relief 120C forms a cleat cavity 120C within segment 120 to prevent any portion of the central cylinder 108C of cleat 108 from contacting any portion of segment 120 (FIGS. 2 and 6). Central cylinder 108C is free to contact the surface of cable 104 which is pressed into contact with surface 120D of segment 120 by the action of central cylinder 108C. Angle 26 denotes the angle formed by surfaces 120A and 120B and cable contact surface 120D in segment 120. Angle 26 is chosen to be shallow, in the range of 10 to 30 degrees. Arrow 27 indicates the force applied to cleat central cylinder 108A to install cleat 108 into cleat cavity 120C of distal segment 120. While cable 104 is held taut, Force 27 is applied to the left of the axis of central cylinder 108C as cleat 108 is guided into the mouth of recess 120C, causing the surface of cylinder 108C to roll CCW against the surface of cable 104 while surfaces 108A and 108B slide against surfaces 120A and 120B, respectively. The acute nature of angle 26 creates a wedging action which decreases the space between surfaces 120A and 120B and 120D as cleat 108 moves progressively into recess 120C. This decrease in space progressively compresses cable 104 between the surface of cleat central cylinder 108C and surface 120D of segment 120 as the cleat 108 rolls along the surface of the cable 104, until the cable 104 becomes completely jammed against surface 120D, stopping the entry of the cleat 108 into recess 120C. Arrow 28 indicates the direction of external tension in cable 104 as the cable is pulled by the action of slider 102 (FIGS. 2, 4, and 6). Tension applied in the direction of arrow 28 causes cleat 108 to rotate CW, with surfaces 108A and 108B rolling against surfaces 120A and 120B, respectively, which causes further compression of cable 104 against surface 120C by cylinder 108C. In this manner, any external tension applied to cable 104 in the direction of arrow 28 acts to proportionally increase the jamming force applied by cleat 108 against cable 104 to retain cable 104 against surface 120D.

It is understood that the same wedging mechanism used by cleat 108 to retain the distal end of cable 104 within distal segment 120 is also used to by the lower cleat 103 to retain the proximal end of cable 104 in slider 102.

Referring now to FIGS. 7-10, there is shown the right tooling member 200. Ribs protruding from the sides of slider 202 are disposed into complementary slots in base 201 so as to prevent the rotation of the base 201 with respect to the slider and limit the translation of base 201 in all directions except along the longitudinal axis of slider 202. A bevel on the forward edge of slider 202 acts to lift any portion of the workpiece that the slider may contact out of the path of the slider as the slider, mechanically fastened to the right jaw 52 of gripper 50, moves towards the workpiece.

Pivot pins 207 pass though complimentary holes in base 201 and segments 210 and 220 to attach common segments 210 to base 201, to each other, and to distal segment 220, forming two chains of pinned articulated segments radiating outwards from base 201. Although segments 210 and segment 220 are shown as being directly supported by pivot pins 207, it is understood that a suitable commercial bearing bushing, radial ball bearing, or needle bearing could be interposed between the pivot hole in the segments and pin 207 when the size of segment is sufficiently large to allow doing so.

The right tooling member 200 may include an adducting tendon 204 having a proximal center portion connected to the slider 202 and distal ends connected to the distal segments 220. The adducting tendon 204 may be in the form of a cable 204. The proximal center portion of cable 204 is routed around pulleys 216 which are supported by pivot pins 206 pressed into complimentary holes in slider 202. In one embodiment cable 204 is a polymer cable which offers the advantages over traditional steel cable of improved resistance to fatigue and corrosion, greater flexibility, improved dissipation of mechanical shock, and lower cost. Pulleys 205, supported by pivot pins 206 pressed into complimentary holes in body 210, route the motion of each end of cable 204 so that as the proximal center of the cable 204 is pulled by the motion of slider 202 relative to body 201, each end of cable 204 is drawn through the central passages of articulated segments 210 of one of the two segment chains. Although pulleys 205 are shown as being directly supported by pivot pins 206, it is understood that a suitable commercial bearing bushing, radial ball bearing, or needle bearing could be interposed between the pulley and pin when the size of pulley 205 is sufficiently large to allow doing so.

Each distal end of cable 204 can be mechanically fastened to distal segment 220 of one segment chain with knurled cylindrical cleat 208. It is understood that such mechanical attachment could also be affected with a suitable adhesive applied between the cable 204 and the segment 220. It is further understood that the same wedging mechanism used by cleat 108 to retain the distal end of cable 104 within distal segment 120 is also used to by cleats 208 to retain each distal end of cable 204 in distal segments 220.

Cable 204 passes over pulleys 209 disposed within each identical segment 210. In this manner, each side of cable 204, suitably attached between slider 202 and distal segment 220, effectively forms a taut adducting tendon located on one side of segment pivot pins 207. Although pulleys 209 are shown as being directly supported by pivot pins 206 pressed into complimentary holes in segments 210, it is understood that a suitable commercial bearing bushing, radial ball bearing, or needle bearing could be interposed between the pulley and pin when the size of pulley 209 is sufficiently large to allow doing so.

It is desirable that each of the two segment chains of tooling member 200 may contact and conform to the profile of a gripped workpiece independently of one another. Such independent conformance assists during the gripping of workpieces possessing a plurality of asymmetric profiles by maximizing the number of contact points between the tooling and workpiece. The articulated motion of any segment chain ceases when that chain fully conforms to the profile of the gripped workpiece, causing motion of the end of cable 204 attached to the fully conformed segment chain to correspondingly cease and become stationary. The ability of cable 204 to laterally translate across pulleys 216, as denoted by arrow 17 in FIG. 10, subsequently allows the length of the cable to shift from the free end to the stationary end, allowing the free end of cable 204 to continue to be pulled by the action of slider 202 translating relative to body 201. Once both segments chains have completely conformed to the workpiece, the ability of cable 204 to translate laterally across pulleys 216 further provides a way of equalizing the tension between the two ends of the cable 204.

The strip 211, constructed of a suitable elastomeric material, effectively forms an abducting tendon located on the opposing side of pivot pins 207. The distal end of strip 211 is attached by suitable means, such as thermal or adhesive bonding, into a complimentary groove in distal segment 220. The proximal end of elastomeric strip 211 is disposed within a complementary slot in body 201 and is attached to body 201 by the clamping action of set-screw 212 or by other suitable thermal or adhesive bonding. The portion of strip 211 between the distal and proximal attached ends is unconstrained and free to stretch or relax. The strip 211 is stretched during installation to create a tension in the strip which acts to pull distal segment 220 toward base 201. This pull induces a torque in distal segment 220 and common segments 210 which acts to rotate each segment CW with respect to pivot pins 207 (FIG. 9). It should be understood by one skilled in the art that the strip 211 could be replaced by one or more helical extension springs or a flexible, but non-stretchable tensile member attached to a suitable spring to provide the same function as an elastomeric strip. It should be appreciated that the orientation of member 200 is reversed in FIG. 7 when compared to FIG. 9.

Bosses 213, protruding from the sides of common segments 210, engage complimentary slots 214, in body 201 and segments 210 to constrain the angle of CW rotation of the segment pinned to base 201 and each successive pinned segment in the segment chain, relative to the prior segment. Thusly constrained by the action of bosses 213 within slots 214, the segments cannot rotate CW about pivots 207 beyond a position in which the segments are in a straight, vertical alignment with one another.

CCW rotation of any segment under the influence of an external torque causes additional stretching of strip 211, with a resulting increase in the torque applied by the strip to the CCW rotated segment. In this manner, strip 211 functions as an abducting tendon which constantly applies a torque to segments 210 and 220 about pivot pin 207 to restore the segments into straight vertical alignment with one another. Downward motion of adductor cable 204 through the central passages of segments 210 induces a CCW torque in segments 210 and 220 that causes the segments to rotate CCW about pivot pins 207, further stretching abductor strip 211.

Pads 215 are suitably bonded into complimentary recesses in segments 210. Pads 215 are constructed of a material such as a suitable elastomer or a nanodiamond impregnated metal substrate, possessing a high coefficient of static friction, so as to enhance the frictional forces generated between the pad and any surface of the gripped workpiece that the pad might contact.

Dimension 23 indicates the orthogonal distance between the center of pivot pin 107 connecting the proximal most common segment 210 to base 201 and the centerline of adductor cable 204. Dimension 24 indicates the orthogonal distance between the respective pivot pins 207 of the remaining segments and the centerline of cable 204. Dimension 25 indicates the orthogonal distance between the pivot pins 207 of the remaining and the centerline of abductor strip 211. In analogous manner to member 100, the cross-sectional area of corresponding abductor strip 211 and orthogonal distances between the pivot pins 207 and centerlines of strip 211 and abductor cable 204 can be similarly chosen to control the rotational order of each segment chain.

Figure 11:
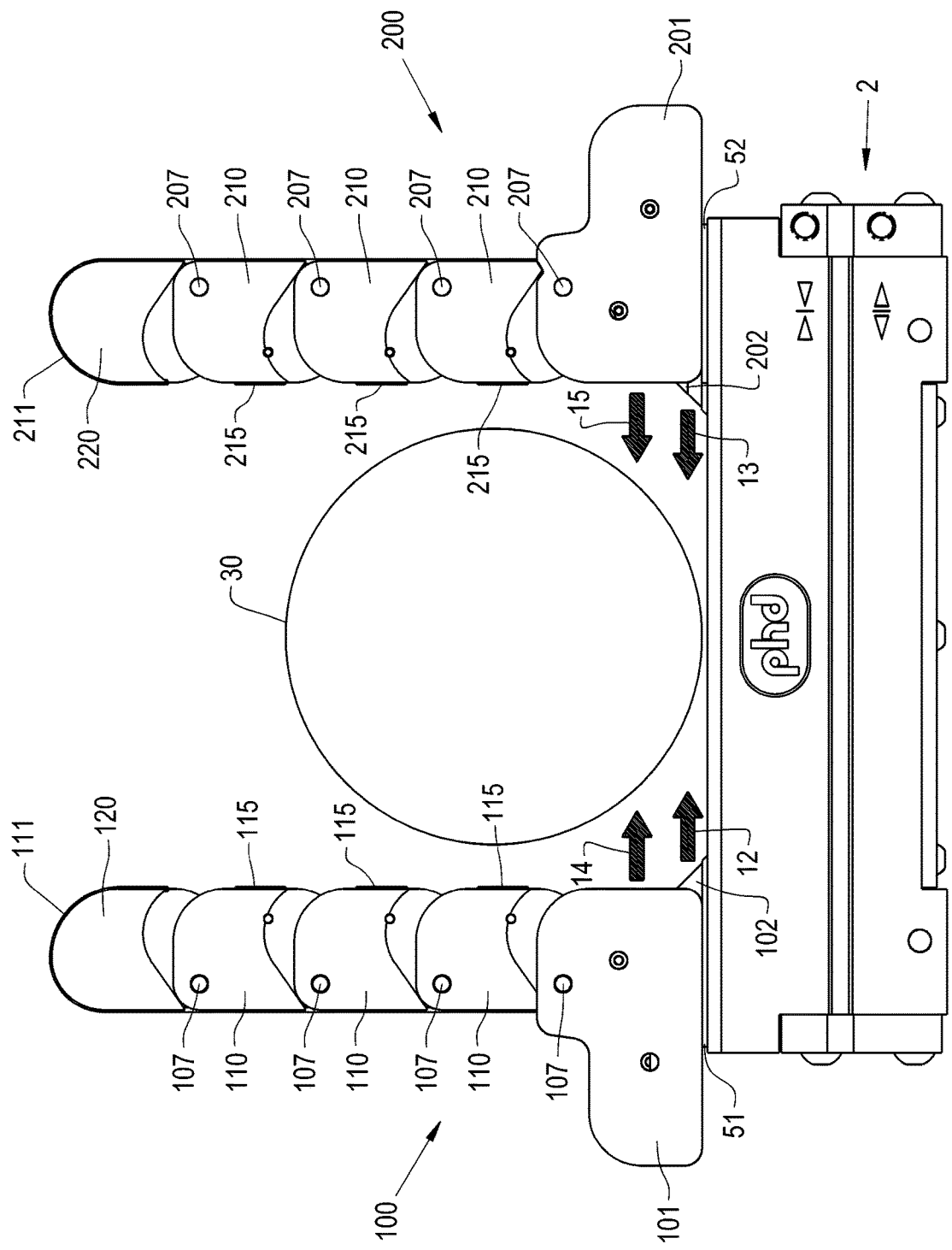
FIG. 11 is a side view of the gripper tooling in an initial position with an example of a cylindrical workpiece.
Figure 12:
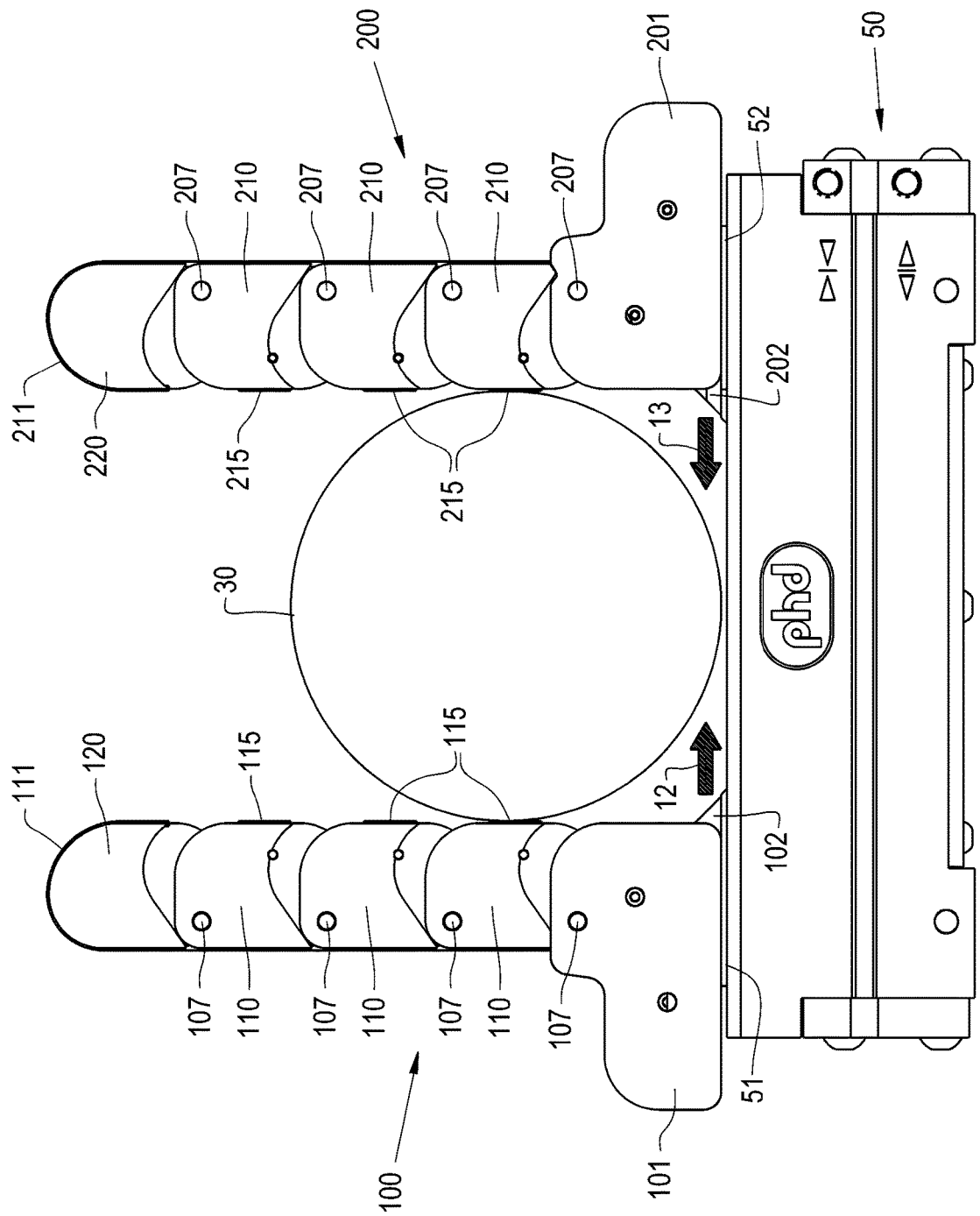
FIG. 12 is a side view of the gripper tooling in an intermediary position with the workpiece as shown in FIG. 11.
Figure 13:
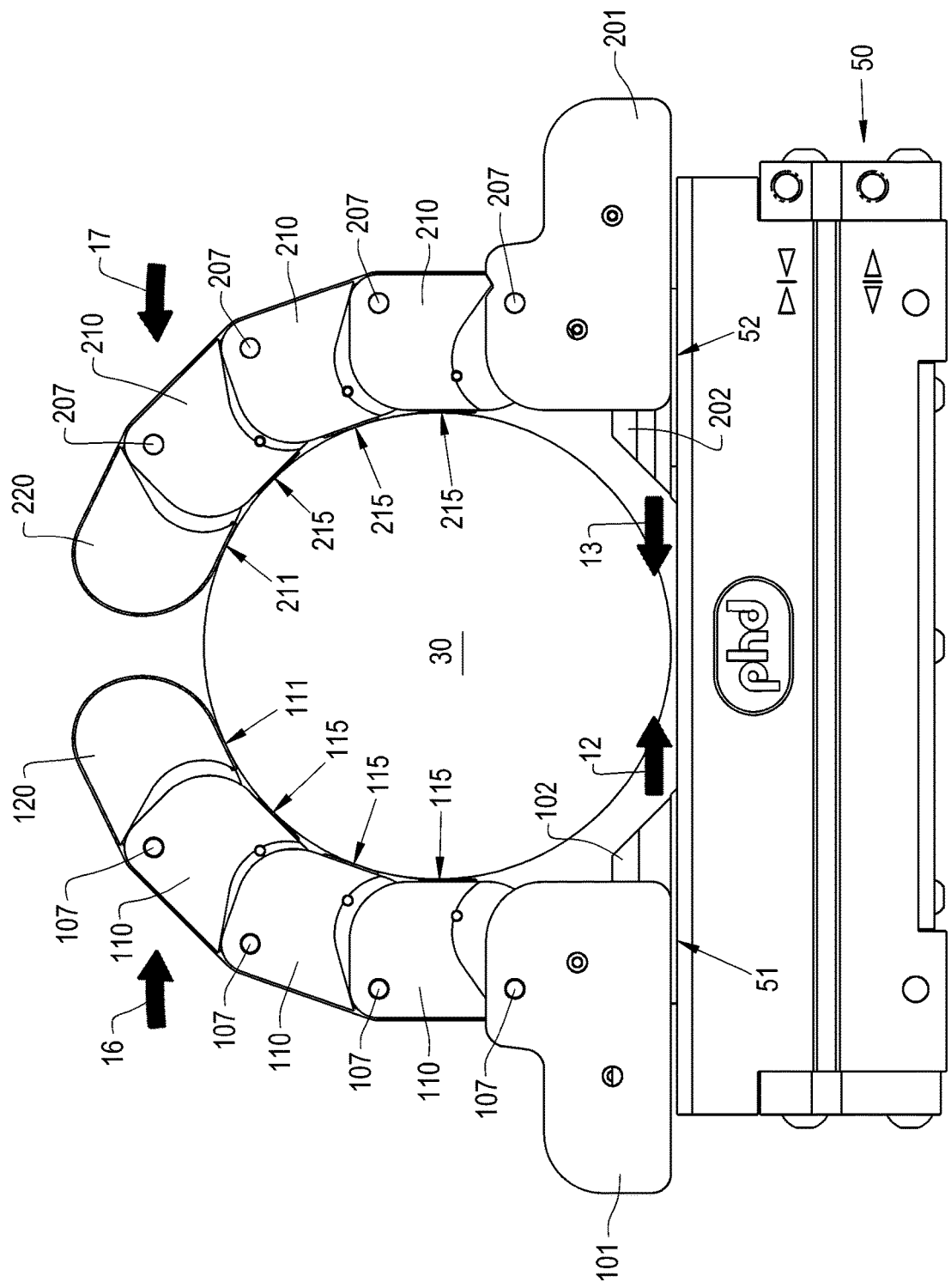
FIG. 13 is a side view of the gripper tooling in an encapsulation position in which the gripper tooling is gripping the workpiece as shown in FIG. 11.
Figure 14:
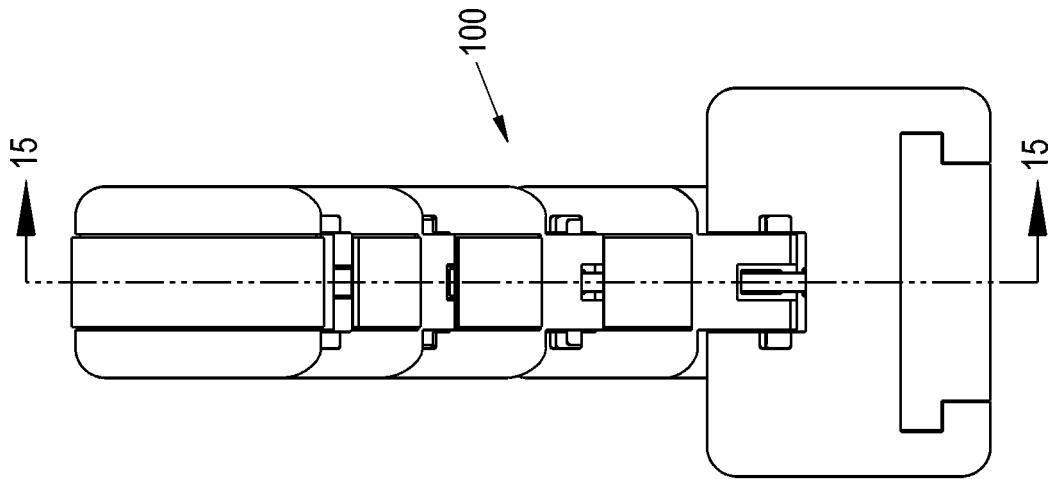
FIG. 14 is a front view of the left tooling member in the encapsulated position.

Referring now to FIGS. 11-13, there is shown the gripper tooling in its sequence operation as the gripper tooling engages an example of a workpiece 30. In FIG. 11, the left jaw 51 and right jaw 52 move the left tooling member 100 and the right tooling member 200 toward cylindrical workpiece 30, in the direction of arrows 12 and 13, respectively. During this motion, the segments comprising the left tooling member 100 and the right tooling member 200 are held in straight vertical alignment by the tension of the stretched elastomeric strips 111 and 211, respectively. So long as all segments are vertically aligned, cables 104 and 204 remain taut, which prevents any relative motion between sliders 102 and base 101 and slider 202 and base 201, as any relative motion between the sliders and bases require CW rotation of segments about pivot pins 107 or CCW rotation of the segments about pivot pins 207 (see also FIGS. 4 and 9). The bases 101 and 201 therefore move in conjunction with respective sliders 102 and 202, as denoted by arrows 14 and 15, respectively.

FIG. 12 shows tooling members 100 and 200 at the moment of initial contact with the workpiece 30. As pad 115 on segment 110 contacts workpiece 30, the finger formed by segments 110 and distal segment 120 pinned together by pivot pins 107 is brought to rest. Base 101 is also brought to rest by the action of segment 110 acting through the pinned connection to base 101 established by pivot pin 107. However, slider 102 remains free to translate under the influence of jaw 51, to which it is fastened, as denoted by arrow 12. In an analogous manner, as pad 215 on segment 210 contacts workpiece 30, the finger formed by segments 210, distal segments 220, and pivot pins 207 is brought to rest by contact with workpiece 30. Base 201 is brought to rest by the action of segment 210 acting through the pinned connection to base 201 established by pivot pin 207, while slider 202 remains free to translate under the influence of jaw 52, as denoted by arrow 13.

Referring now collectively to FIGS. 11-17, there is shown the tooling members 100 and 200 gripping the workpiece 30. Once base 101 is brought to rest by the segment chain, including segments 110 and 120 and pins 107, acting against workpiece 30, slider 102 continues to translate under the action of gripper jaw 51, relative to stationary base 101. Such relative motion pulls adductor cable 104, routed around pulleys 105, downward through the central passages of segments 110. Downward motion of cable 104 induces a CW torque in segments 110 and 120 that causes the segments to rotate CW in the direction of arrow 16 about pivot pins 107, stretching abductor strip 111 and forcing pads 115 bonded to segments 110 and strip 111 bonded onto distal segment 120 into conformal contact with the surface of workpiece 30.

Once base 201 is brought to rest by either segment chain, including segments 210 and 220 and pins 207, contacting the workpiece 30, slider 202 continues to translate under the action of gripper jaw 52, relative to stationary base 201. Such relative motion pulls adductor cable 204, routed around pulleys 205, downward through the central passages of segments 210. Downward motion of cable 204 induces a CCW torque in segments 210 and 220 that causes the segments to rotate CCW in the direction of arrow 17 about pivot pins 207, stretching abductor strip 211 and forcing pads 215 bonded to segments 210 and strip 211 bonded onto distal segment 220 into conformal contact with the surface of workpiece 30.

Figure 15:
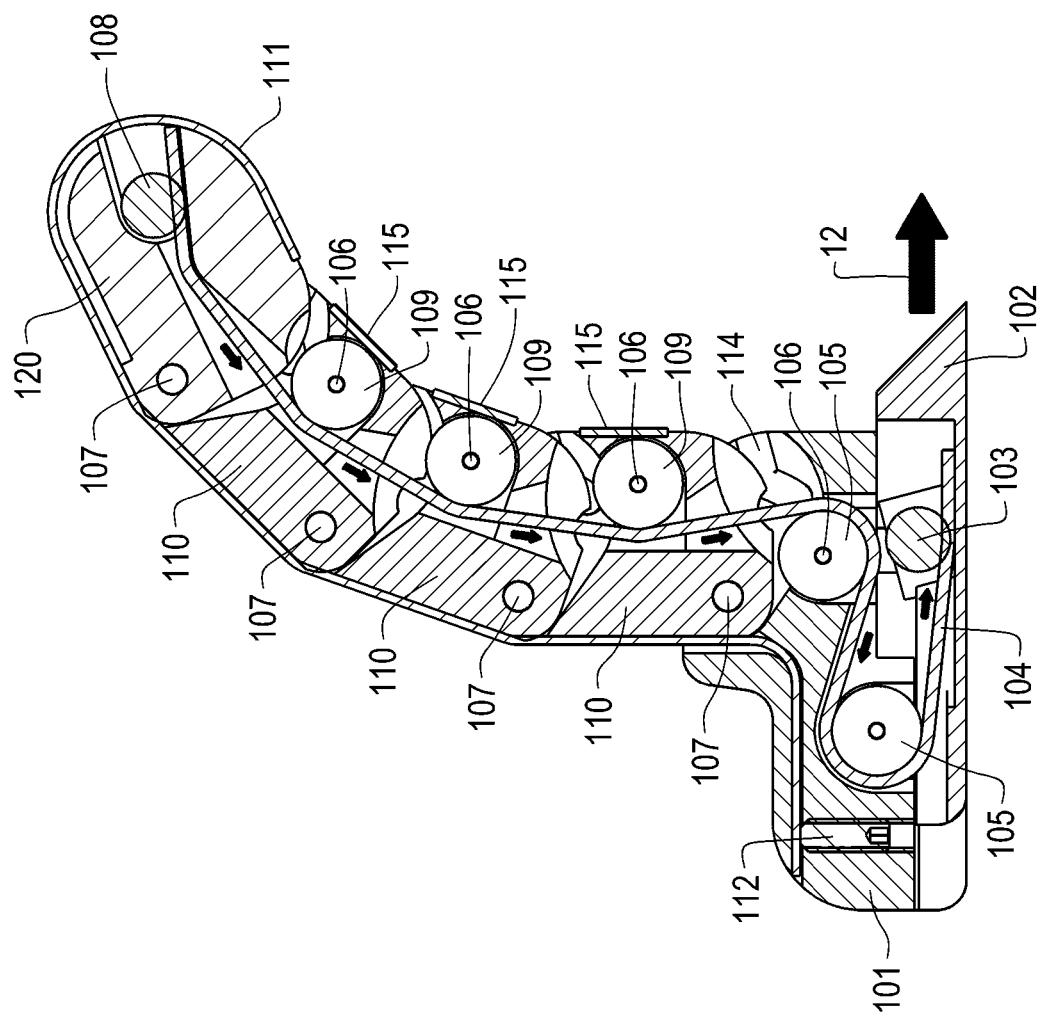
FIG. 15 is a cross-sectional view of the left tooling member in the encapsulated position, taken across line 15-15 in FIG. 14.

Referring now to FIGS. 15 and 17, there is shown the tooling members 100, 200 in the actuated, encapsulating position. The small black arrows denote both the direction of motion and the direction of the corresponding motive tension of adductor cables 104, 204 as the cables 104, 204 are drawn through the respective central passages of segments 110, 210.

In one form of the embodiment, the cross-sectional area of strip 111 is kept constant along the length of the strip and orthogonal distance 22 is kept constant for all segments while the value of orthogonal distance 20 for the proximal most segment 110 pinned to base 101 is chosen to be greater than the value of distance 21 for the remainder of the segments. The cross-sectional area of strip 211 is chosen to match that of strip 111 and the values for the orthogonal distances 23, 24, and 25 are chosen to match the values chosen for distances 20, 21, and 22, respectively.

This form increases the force applied to the gripped workpiece by the proximal most segments 110 and 210 while reducing the forces applied to the workpiece by the remaining segments. Concentrating the force distribution toward the proximal end of the segment chains provides the advantage of reducing the moments generated about sliders 102 and 202, by the finger chains during gripping, reducing the reaction forces between the bases and sliders and the frictional losses that arise from these reaction forces which reduce the efficiency of the gripper.

In another form of the embodiment, the cross-sectional area of strips 111 and 211 is progressively reduced from the proximal end to the distal end of each strip and orthogonal distances 22 and 25 are kept equal for all segments. The values of orthogonal distances 20 and 23 for the proximal most segments are made equal to values for distances 21 and 24 for the remainder of the segments.

This form causes the distal segments 120 and 220 to rotate first when the segment chain contacts the workpiece, with the remainder of the respective segment chains rotating in succession from the distal most to the proximal most segments. This manner of progressive distal to proximal rotation provides the advantage of pushing the contacted workpiece progressively toward the gripper, so that the gripped work-piece rests as closely as possible to the gripper.

It will also be apparent that the same manner of progressive distal to proximal segment rotation can be accomplished by choosing the values for orthogonal distances 20 and 23 for the proximal most segments to be less than the values of distances 21 and 24 for the remainder of the segments, with the local values of distances 21 and 24 progressively increasing from the proximal end to the distal end of each respective segment chain. This proximal to distal progression of pivot pin to adductor cable spacing can be performed either independently or in conjunction with the proximal to distal cross-sectional tapering of abductor strips 111 and 211.

Figure 18:
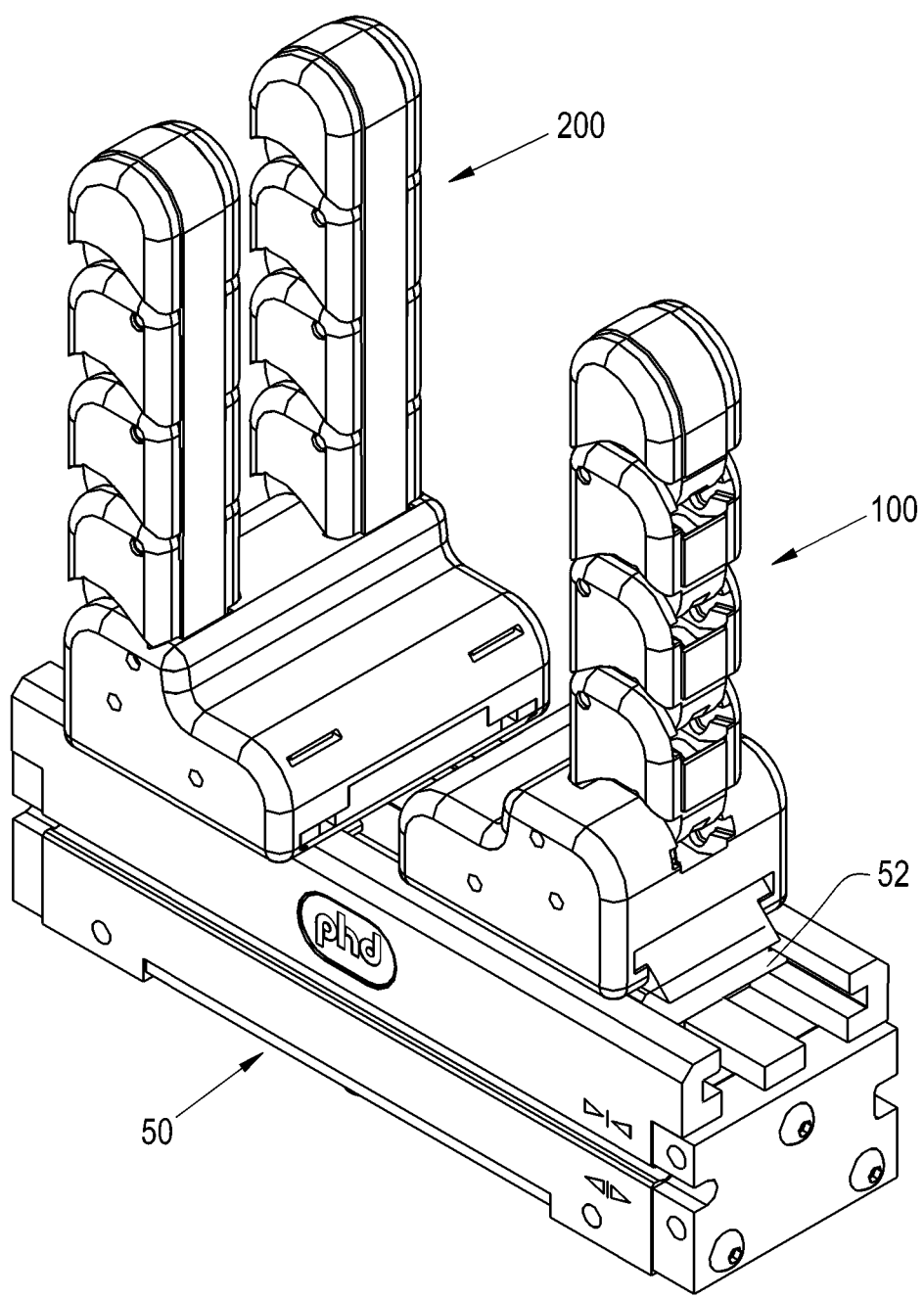
FIG. 18 is a perspective view of another embodiment of a gripper tooling according to the present invention.

Referring now to FIG. 18, there is shown another embodiment of a gripper tooling in which the tooling members 100 and 200 upon gripper 50 are juxtaposed. This form provides for gripping during the opening, rather than the closing, of the gripper jaws 51 (not shown) and 52. Such a manner of gripping is desirable when the workpiece is hollow such as a pipe, hoop or torus and needs to be gripped from the interior opening.

In another embodiment of the present invention, a magnet is added to sliders 102 and 202 and a magnet sensing switch is added to bases 101 and 201, allowing each switch to detect the position of the respective slider relative to the respective base. Detecting relative motion between each respective slider and base provides a desirable means of electronically communicating the onset of contact between each tooling member and the gripped workpiece. This allows the gripper jaws 51, 52 to move rapidly toward the workpiece, but then slow down to allow for a more precise gripping and/or for the gripping force to be limited until contact with a workpiece is detected and/or verified to be in a desired location in order to enhance operational concerns.

Figure 20:
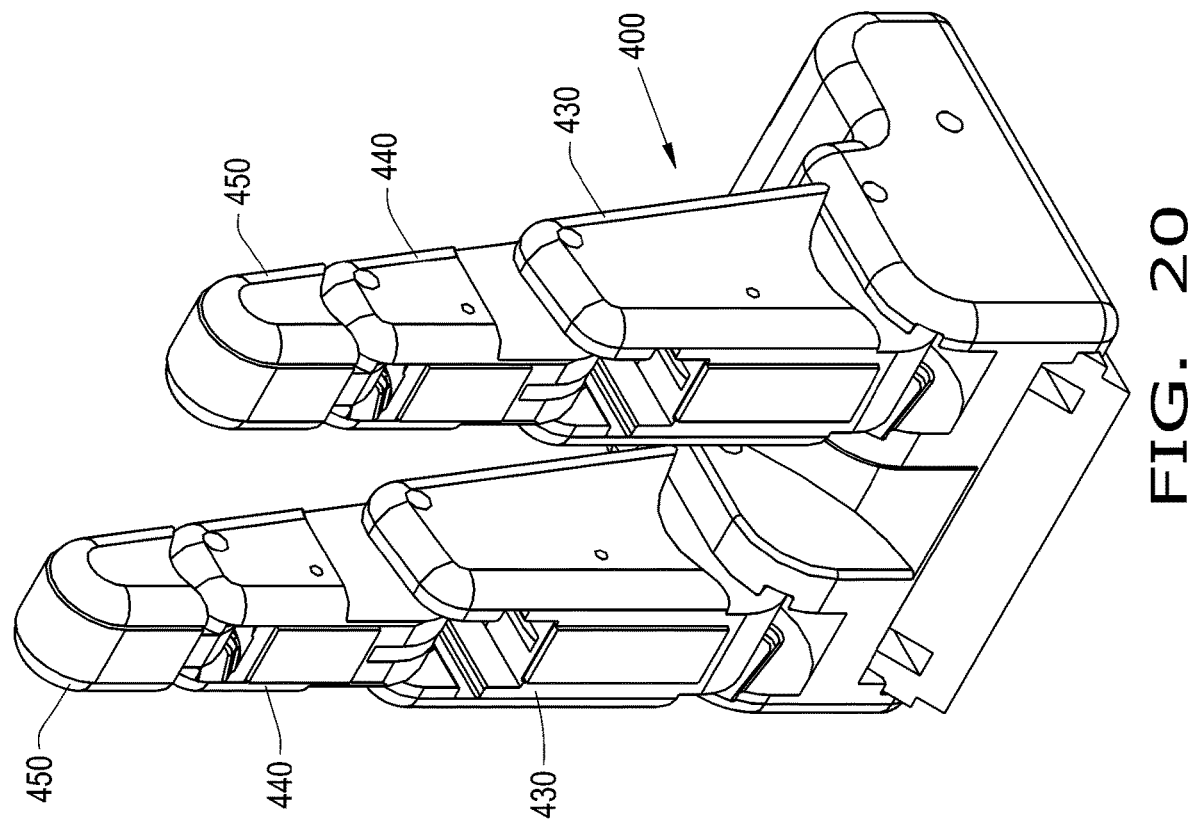
FIG. 20 is a perspective view of another embodiment of a gripper according to the present invention.
Figure 19:
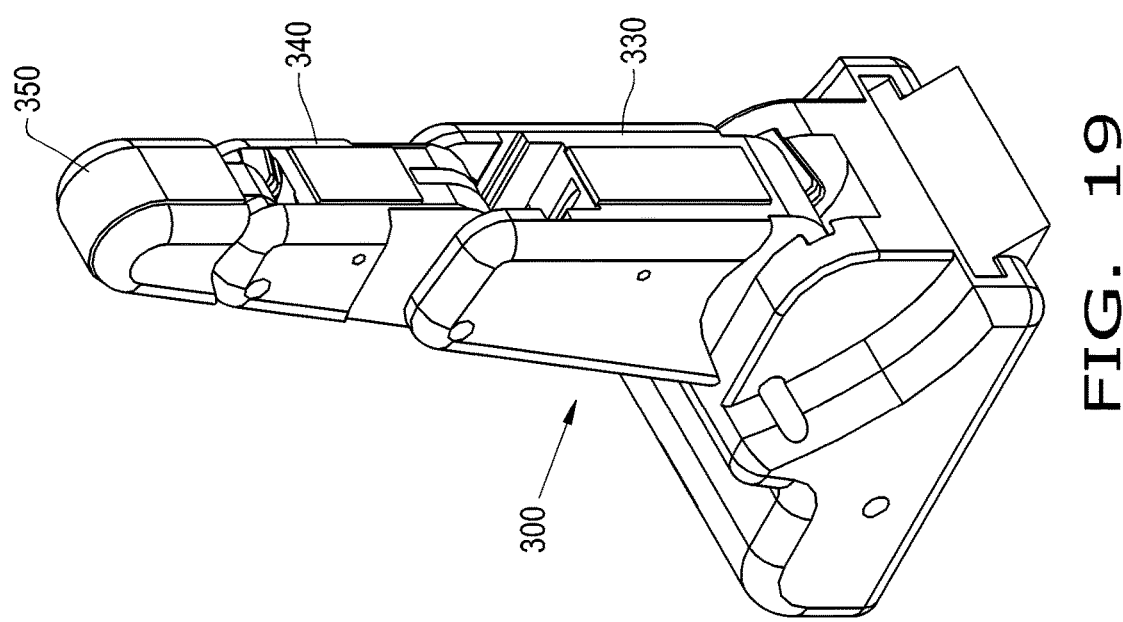
FIG. 19 is a perspective view of another embodiment of a gripper according to the present invention.

Referring now to FIGS. 19-20, there is shown another embodiment of the present invention which includes left and right tooling members 300, 400. The segment chains are chosen to resemble the number, size, shape, and physical proportions of a representative human finger or thumb. Right tooling member 300 comprises a single segment chain while left tooling member 400 comprises two or more segment chains. The segment chain of tooling member 300 can be chosen to comprise a proximal 330, middle 340 and distal segment 350 to resemble a human finger or only a proximal 330 and distal 350 segment to resemble a human thumb. Each segment chain of tooling member 400 comprises a proximal 430, middle 440 and distal segment 450 to resemble a human finger.

Figure 21:
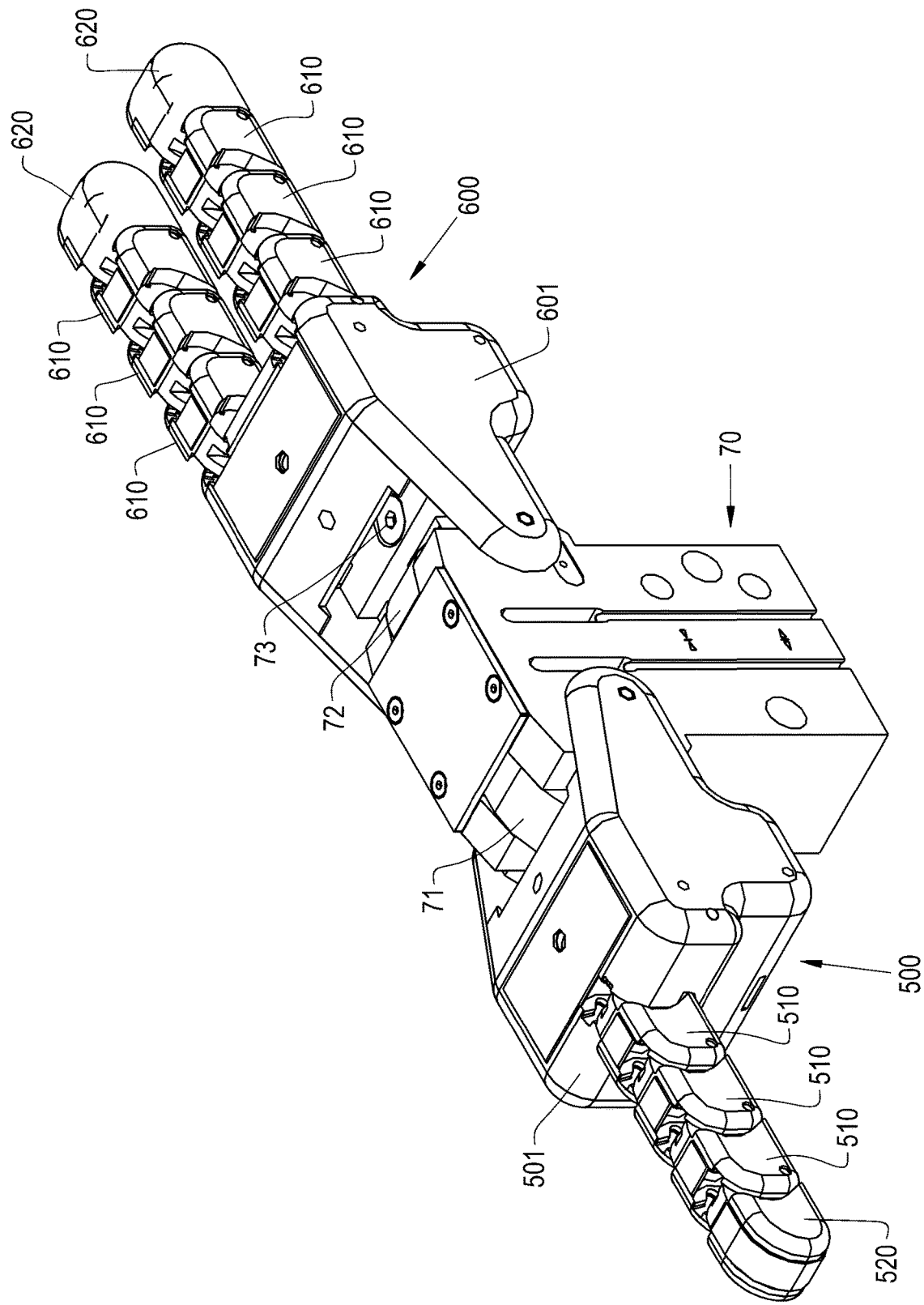
FIG. 21 is a perspective view of another embodiment of a gripper tooling with left and right tooling members having angular jaw travel according to the present invention.

Referring now to FIGS. 21-24, there is shown another embodiment of the present invention which is configured to mount to an illustrative gripper with angular jaw travel 70, such as the GRB series gripper manufactured by the PHD Corporation. Left tooling member 500 generally includes a single finger having a base 501 to which is attached a chain of multiple identical articulated segments 510, capped by articulated distal segment 520. Rotor 502 attaches left tooling member 500 to the left jaw 71 of gripper 70 with threaded fasteners 73 (not shown in FIG. 21). Right tooling member 600 generally includes a base 601 to which is attached two fingers having multiple identical articulated segments 610, capped by identical articulated distal segments 620. Rotor 602 attaches right tooling member 600 to the right jaw 72 of gripper 70 with threaded fasteners 73 (only one of two is shown in FIG. 21). Although the present embodiment illustrates similar finger construction for the left and right fingers, it should be appreciated by one skilled in the art that the articulated segments having the left and right fingers can also differ in quantity, overall dimensions, construction, and physical arrangement from those illustrated. It is also understood that left and right fingers need not be of similar construction to one another and that the quantity of fingers present on each tooling member can be varied without affecting the fundamental nature of the invention.

Figure 22:
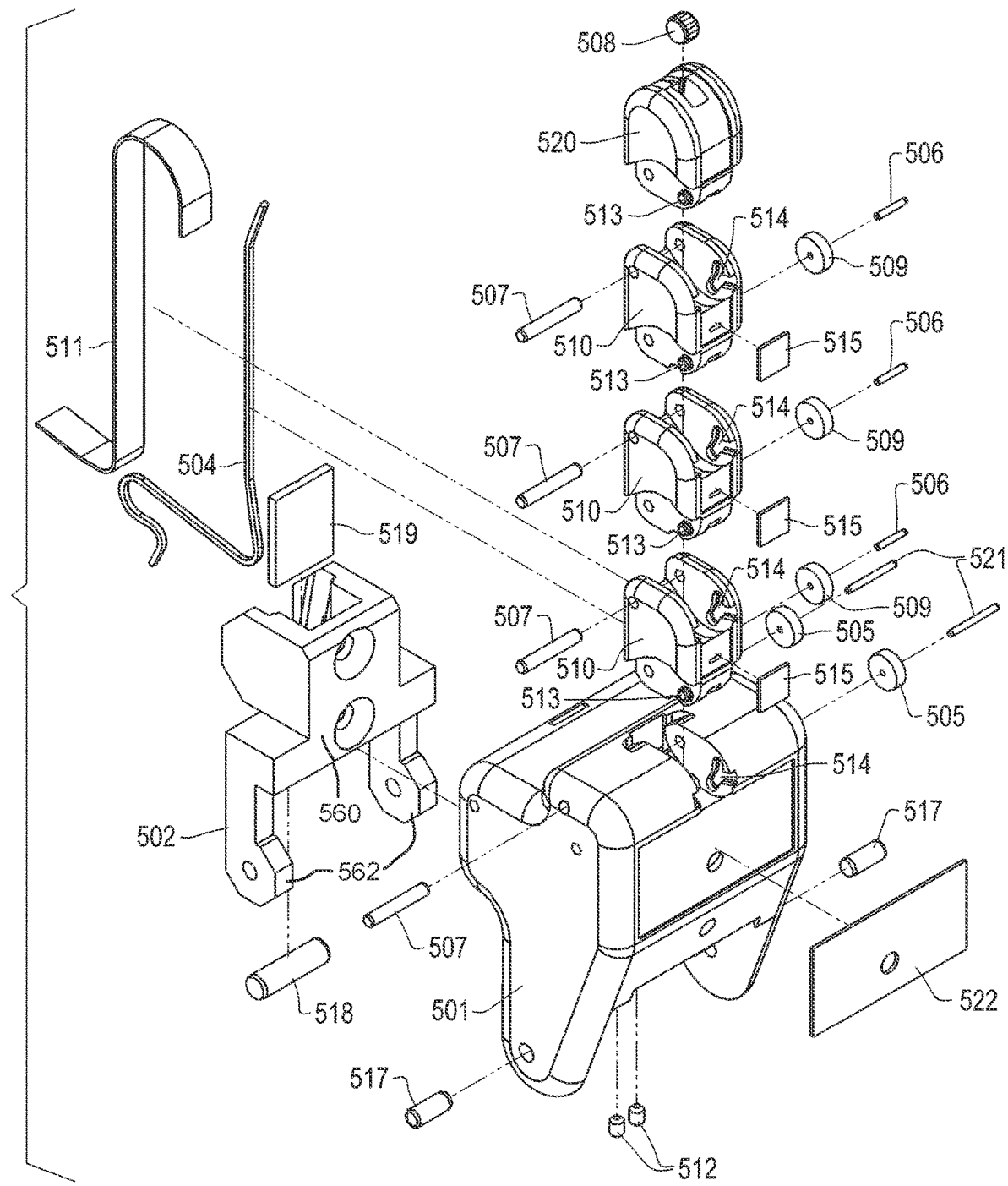
FIG. 22 is an exploded view of the left tooling member of the gripper tooling as shown in FIG. 21.

Referring now to FIG. 22, there is shown the left tooling member 500. The pins 517 pass through complimentary holes in base 501 and are pressed into complementary holes in rotor 502 so as to allow the rotation of the rotor 502 with respect to the base 501 while preventing the translation of base 501 with respect to rotor 502. Complimentary countersunk holes in rotor 502 allow the rotor to be mechanically fastened with threaded fasteners 73 (not shown in FIG. 22) to the left jaw 71 of gripper 70. Rotor 502 includes a rotor body 560 and a plurality of legs 562 extending from rotor body 560, rotor body 560 being fixedly connected to, and thereby configured for rotating with, left jaw 71.

The left tooling member 500 may include an adducting tendon 504 having a proximal end connected to the rotor 502 and a distal end connected to the distal segment 520. The adducting tendon 504 may be in the form of a cable 504. The cylindrical cleat 518 mechanically fastens the proximal end of the cable 504 to rotor 502 by compressing the cable 504 against cleat plate 519, the vertical sides of which are disposed within complimentary slots within rotor 502. The cylindrical ends of cleat 518 are suitably retained within angled complimentary slots within rotor 502. In this manner, cable 504 is held frictionally captured by the action of cleat 518 against plate 519. It should be appreciated that such mechanical attachment could also be affected with a suitable adhesive applied between the cable and the rotor. In one embodiment, the cable 504 is a polymer cable which offers the advantages over traditional steel cable of improved resistance to fatigue and corrosion, greater flexibility, improved dissipation of mechanical shock, and lower cost. Pulleys 505, supported by pivot pins 521 pressed into complimentary holes in body 501, route the motion of cable 504 so that as the proximal end of the cable is pulled by the rotation of rotor 502 relative to body 501, cable 504 is drawn through the central passages of articulated segments 510. Although pulleys 505 are shown as being directly supported by pivot pins 506, it is understood that a suitable commercial bearing bushing, radial ball bearing, or needle bearing could be interposed between the pulley and pin when the size of pulley 505 is sufficiently large to allow doing so.

Pivot pins 507 pass though complimentary holes in base 501 and segments 510 and 520 to attach common segments 510 to base 501, to each other, and to distal segment 520, forming a chain of pinned articulated segments radiating outwards from base 501. Although segments 510 and segment 520 are shown as being directly supported by pivot pins 507, it should be appreciated that a suitable commercial bearing bushing, radial ball bearing, or needle bearing could be interposed between the pivot hole in the segments and pin 507 when the size of segment is sufficiently large to allow doing so.

The distal end of cable 504 is mechanically fastened to distal segment 520 with knurled cylindrical cleat 508. However, it should be appreciated that such mechanical attachment could also be affected with a suitable adhesive applied between the cable and the segment. Cable 504 passes over pulleys 509 disposed within each identical segment 510. In this manner, cable 504, suitably attached between rotor 502 and distal segment 520, effectively forms a taut adducting tendon located on one side of segment pivot pins 507. Although pulleys 509 are shown as being directly supported by pivot pins 506 pressed into complimentary holes in segments 510, it is understood that a suitable commercial bearing bushing, radial ball bearing, or needle bearing could be interposed between the pulley and pin when the size of pulley 509 is sufficiently large to allow doing so.

The strip 511, constructed of a suitable elastomeric material, effectively forms an abducting tendon located on the opposing side of pivot pins 507. The distal end of strip 511 is attached by suitable means, such as thermal or adhesive bonding, into a complimentary groove in distal segment 520. The proximal end of elastomeric strip 511 is disposed within a complementary slot in body 501 and is attached to body 501 by the clamping action of set-screws 512 or by other suitable thermal or adhesive bonding. The portion of strip 511 between the distal and proximal attached ends is unconstrained and free to stretch or relax. Strip 511 is stretched during installation to create a tension in the strip which acts to pull distal segment 520 toward base 501. This pull induces a torque in distal segment 520 and common segments 510 which acts to rotate each segment counterclockwise (CCW) with respect to pivot pins 507. It should be appreciated that the strip 511 could be replaced by one or more helical extension springs or a flexible, but non-stretchable tensile member attached to a suitable spring to provide the same function as an elastomeric strip.

The bosses 513, protruding from the sides of common segments 510, engage complimentary slots 514, in body 501 and segments 510 to constrain the angle of CCW rotation of the segment pinned to base 501 and each successive pinned segment in the segment chain, relative to the prior segment. Thusly constrained by the action of bosses 513 within slots 514, the segments cannot rotate CCW about pivots 507 beyond a position in which the segments are in a straight, vertical alignment with one another.

Clockwise (CW) rotation of any segment under the influence of an external torque causes additional stretching of strip 511, with a resulting increase in the torque applied by the strip to the CW rotated segment. In this manner, strip 511 functions as an abducting tendon which constantly applies a torque to segments 510 and 520 about pivot pin 507 to restore the segments into straight vertical alignment with one another. Downward motion of adductor cable 504 through the central passages of segments 510 induces a CW torque in segments 510 and 520 that causes the segments to rotate CW about pivot pins 507, further stretching abductor strip 511.

The pads 515 are suitably bonded into complimentary recesses in segments 510. Pad 522 is suitably bonded into a complimentary recess in base 501. The pads 515 and 522 are constructed of a material such as a suitable elastomer or a nanodiamond impregnated metal substrate, possessing a high coefficient of static friction, so as to enhance the frictional forces generated between the pad and any surface of the gripped workpiece that the pad might contact.

In an analogous manner to the cleat 108 mechanically fastening the distal end of cable 104 onto segment 120, the cleat 508 fastens the distal end of cable 504 onto segment 520. It should be appreciated that the same wedging action used by the cleat 108 to retain the distal end of cable 104 within distal segment 120 is also used by the cleat 518 to retain the proximal end of cable 504 in rotor 502.

Figure 23:
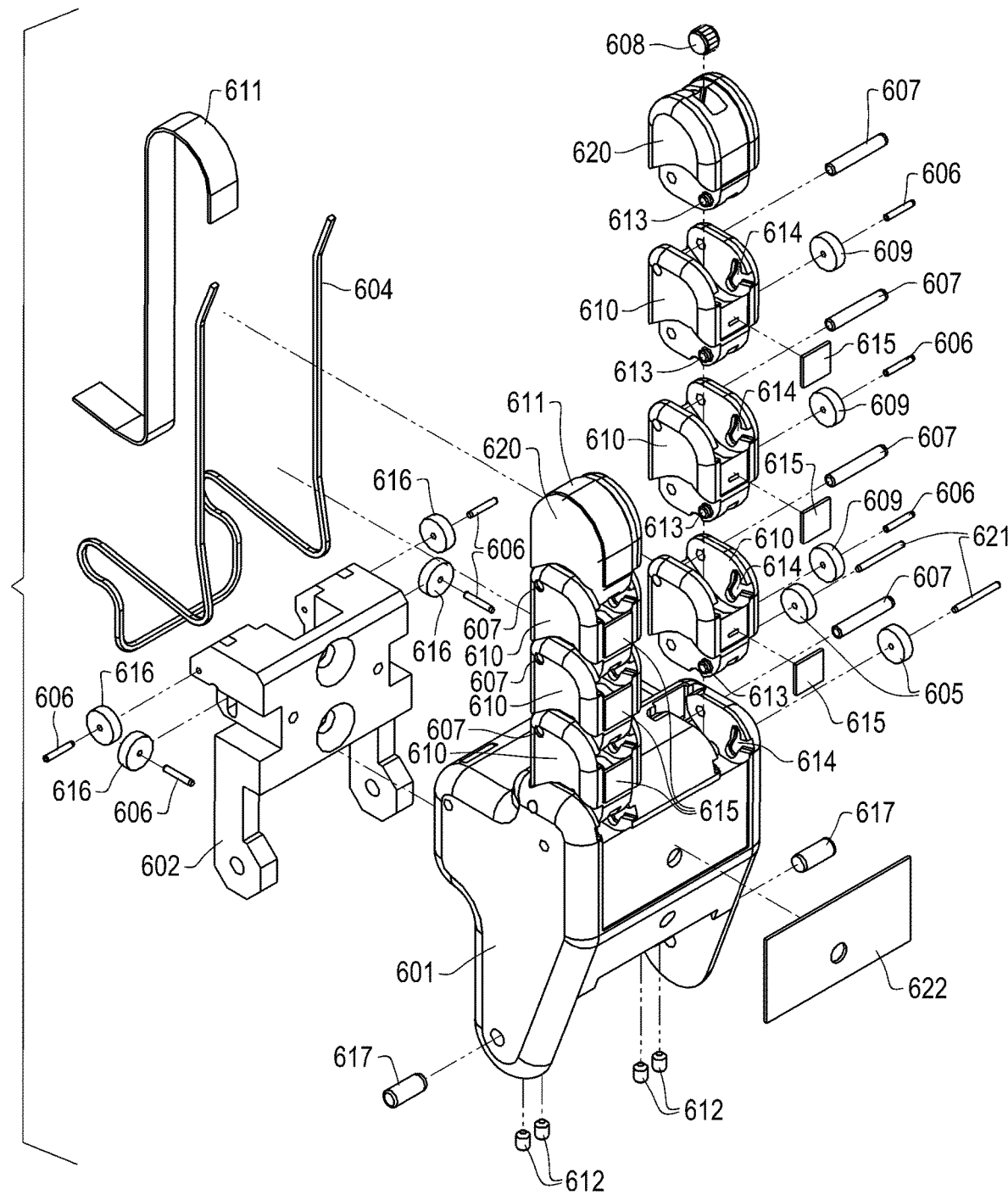
FIG. 23 is an exploded view of the right tooling member of the gripper tooling as shown in FIG. 21.

Referring now to FIG. 23, there is shown the right tooling member 600. The pins 617 pass through complimentary holes in base 601 are pressed into complementary holes in rotor 602 so as to allow the rotation of the rotor with respect to the base while preventing the translation of base 601 with respect to rotor 602. Complimentary countersunk holes in rotor 602 allow the rotor to be mechanically fastened with threaded fasteners 73 (not shown in FIG. 23) to the right jaw 72 of gripper 70.

Pivot pins 607 pass though complimentary holes in base 601 and segments 610 and 620 to attach common segments 610 to base 601, to each other, and to distal segment 620, forming two chains of pinned articulated segments radiating outwards from base 601. Although segments 610 and segment 620 are shown as being directly supported by pivot pins 607, it is understood that a suitable commercial bearing bushing, radial ball bearing, or needle bearing could be interposed between the pivot hole in the segments and pin 607 when the size of segment is sufficiently large to allow doing so.

The right tooling member 600 may include an adducting tendon 604 having a proximal end connected to the rotor 602 and a distal end connected to the distal segment 620. The adducting tendon 604 may be in the form of a cable 604. The proximal center portion of cable 604 is routed around pulleys 616 which are supported by pivot pins 606 pressed into complimentary holes in rotor 602. In one embodiment, the cable 604 is a polymer cable which offers the advantages over traditional steel cable of improved resistance to fatigue and corrosion, greater flexibility, improved dissipation of mechanical shock, and lower cost. The pulleys 605, supported by pivot pins 621 pressed into complimentary holes in body 610, route the motion of each end of cable 604 so that as the proximal center of the cable is pulled by the motion of rotor 602 relative to body 601, each end of cable 604 is drawn through the central passages of articulated segments 610 of one of the two segment chains. Although pulleys 605 and 616 are shown as being directly supported by pivot pins 621 and 606 respectively, it is understood that a suitable commercial bearing bushing, radial ball bearing, or needle bearing could be interposed between the pulley and pin when the size of pulley 605 and/or 616 is sufficiently large to allow doing so.

Each distal end of cable 604 can be mechanically fastened to distal segment 620 of one segment chain with knurled cylindrical cleat 608. It should be appreciated that such mechanical attachment could also be affected with a suitable adhesive applied between the cable and the segment. It should be further appreciated that the same wedging mechanism used by the cleat 508 to retain the distal end of cable 504 within distal segment 520 is also used to by the cleats 608 to retain each distal end of cable 604 in distal segments 620.

Cable 604 passes over pulleys 609 disposed within each identical segment 610. In this manner, each side of cable 604, suitably attached between rotor 602 and distal segment 620, effectively forms a taut adducting tendon located on one side of segment pivot pins 607. Although pulleys 609 are shown as being directly supported by pivot pins 606 pressed into complimentary holes in segments 610, it is understood that a suitable commercial bearing bushing, radial ball bearing, or needle bearing could be interposed between the pulley and pin when the size of pulley 609 is sufficiently large to allow doing so.

It may be desirable that each of the two segment chains of tooling member 600 may contact and conform to the profile of a gripped workpiece independently of one another. Such independent conformance assists during the gripping of workpieces possessing a plurality of asymmetric profiles by maximizing the number of contact points between the tooling and workpiece. The articulated motion of any segment chain ceases when that chain fully conforms to the profile of the gripped workpiece, causing motion of the end of cable 604 attached to the fully conformed segment chain to correspondingly cease and become stationary. The ability of the cable 604 to laterally translate across pulleys 616 subsequently allows the length of the cable to shift from the free end to the stationary end, allowing the free end of cable 604 to continue to be pulled by the action of rotor 602 rotating relative to body 601. Once both segments chains have completely conformed to the workpiece, the ability of cable 604 to translate laterally across pulleys 616 further provides a way of equalizing the tension between the two ends of the cable 604.

The strip 611, constructed of a suitable elastomeric material, effectively forms an abducting tendon located on the opposing side of pivot pins 607. The distal end of strip 611 is can be attached by any desired fastener or adhesive, such as thermal or adhesive bonding, into a complimentary groove in distal segment 620. The proximal end of elastomeric strip 611 is disposed within a complementary slot in body 601 and is attached to body 601 by the clamping action of set-screws 612 or by other suitable thermal or adhesive bonding. The portion of strip 611 between the distal and proximal attached ends is unconstrained and free to stretch or relax. Strip 611 is stretched during installation to create a tension in the strip which acts to pull distal segment 620 toward base 601. This pull induces a torque in distal segment 620 and common segments 610 which acts to rotate each segment CW with respect to pivot pins 607. It will be understood by one skilled in the art that strip 611 could be replaced by one or more helical extension springs or a flexible, but non-stretchable tensile member attached to a suitable spring to provide the same function as an elastomeric strip.

The bosses 613, protruding from the sides of common segments 610, engage complimentary slots 614, in body 601 and segments 610 to constrain the angle of CW rotation of the segment pinned to base 601 and each successive pinned segment in the segment chain, relative to the prior segment. Thusly constrained by the action of bosses 613 within slots 614, the segments cannot rotate CW about pivots 607 beyond a position in which the segments are in a straight, vertical alignment with one another.

CCW rotation of any segment under the influence of an external torque causes additional stretching of strip 611, with a resulting increase in the torque applied by the strip to the CCW rotated segment. In this manner, strip 611 functions as an abducting tendon which constantly applies a torque to segments 610 and 620 about pivot pin 607 to restore the segments into straight vertical alignment with one another. Downward motion of adductor cable 604 through the central passages of segments 610 induces a CCW torque in segments 610 and 620 that causes the segments to rotate CCW about pivot pins 607, further stretching abductor strip 611. It should be appreciated that the orientation of member 600 is reversed in FIG. 23 when compared to FIG. 24.

The pads 615 are suitably bonded into complimentary recesses in segments 610. The pad 622 is suitably bonded into a complimentary recess in base 601. The pads 615 and 622 are constructed of a material such as a suitable elastomer or a nanodiamond impregnated metal substrate, possessing a high coefficient of static friction, so as to enhance the frictional forces generated between the pad and any surface of the gripped workpiece that the pad might contact.

Figure 24:
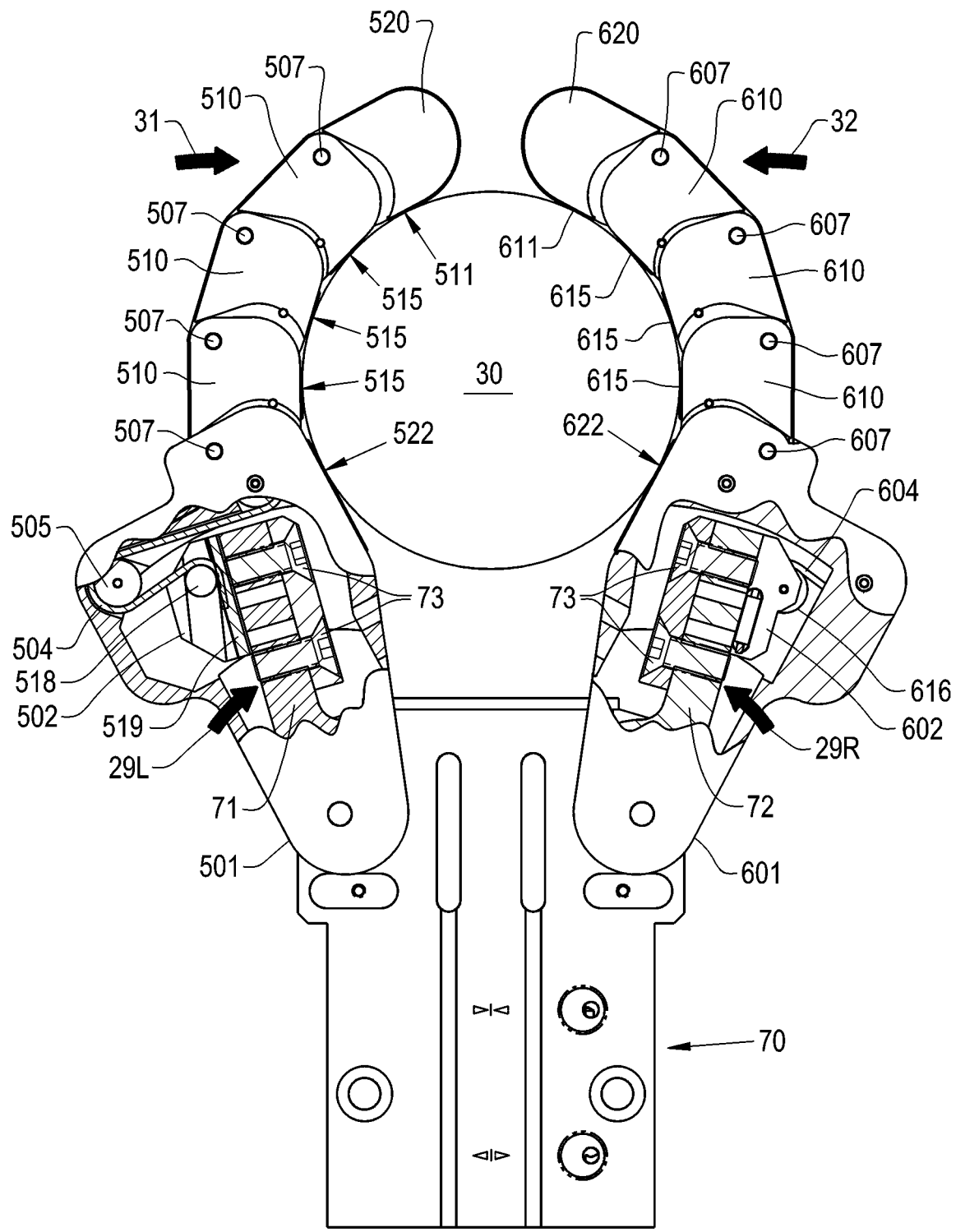
FIG. 24 is a side view of the gripper tooling as shown in FIGS. 21-23 in the encapsulated position.

Referring now specifically to FIG. 24, there is shown the tooling members 500 and 600 gripping the example of the cylindrical workpiece 30. Once the base 501 is brought to rest by contact of pad 522 with workpiece 30, rotor 502 continues to rotate in the direction of arrow 29L under the action of gripper jaw 71, relative to stationary base 501. Such relative motion pulls adductor cable 504, routed around pulleys 505, downward through the central passages of segments 510. Downward motion of the cable 504 induces a CW torque in segments 510 and 520 that causes the segments to rotate CW in the direction of arrow 31 about pivot pins 507, stretching abductor strip 511 and forcing pads 515 bonded to segments 510 and strip 511 bonded onto distal segment 520 into conformal contact with the surface of workpiece 30.

Once base 601 is brought to rest by contact of pad 622 with workpiece 30, slider 602 continues to rotate in the direction of arrow 29R under the action of gripper jaw 72, relative to stationary base 601. Such relative motion pulls adductor cable 604, routed around pulleys 605, downward through the central passages of segments 610. Downward motion of cable 604 induces a CCW torque in segments 610 and 620 that causes the segments to rotate CCW in the direction of arrow 32 about pivot pins 607, stretching abductor strip 611 and forcing pads 615 bonded to segments 610 and strip 611 bonded onto distal segment 620 into conformal contact with the surface of workpiece 30. The motive tension of each adductor cable 504, 604 as the cable 504, 604 is drawn through the respective central passage of segments 510, 610 is directed downwardly.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A gripper tooling, comprising:
a gripper having a gripper body and at least one angular jaw;
at least one rotor including a rotor body and a plurality of legs extending from the rotor body, the rotor body of the at least one rotor being fixedly connected to, and thereby configured for rotating with, the at least one angular jaw; and at least one tooling member configured for gripping a workpiece, each said tooling member including:
  a base pivotally connected to the plurality of legs of the at least one rotor, the plurality of legs of the at least one rotor being disposed within the base;
  at least one middle segment pivotally connected to the base;
  a distal segment pivotally connected to the at least one middle segment;
  an adducting tendon having a proximal end attached to the rotor body of the at least one rotor and a distal end attached to the distal segment, the at least one rotor configured for rotating relative to the base and thereby for tensioning the adducting tendon; and
  an abducting tendon having a proximal end attached to the base and a distal end attached to the distal segment such that the at least one tooling member is configured for autonomously gripping the workpiece as the at least one angular jaw rotates toward the workpiece and the at least one tooling member autonomously returns to an ungripped position as the at least one angular jaw rotates away from the workpiece, the abducting tendon having an absence of an assembly including a tendon and a linear spring attached to a distal end of the tendon.

2. The gripper tooling of claim 1, wherein in gripping the workpiece the base is configured to be immobilized by the workpiece and the at least one rotor is configured to rotate relative to the base toward the workpiece, tensioning the adducting tendon and causing a rotation of the at least one middle segment and the distal segment, in a first direction, for gripping the workpiece.

3. The gripper tooling of claim 2, wherein the angular jaw is configured for pivoting the base and the at least one rotor as a single unit until the workpiece stops the base, and then for pivoting the at least one rotor relative to the base so as to tension the adducting tendon.

4. The gripper tooling of claim 3, wherein in gripping the workpiece, the abducting tendon is stretched as the at least one middle segment and the distal segment rotate in the first direction, and in the ungripped position the abducting tendon is configured for rotating the at least one middle segment and the distal segment rotate in a second direction.

5. The gripper tooling of claim 4, wherein the abducting tendon overlays a portion of the distal segment and is thereby configured for contacting the workpiece when the tooling member grips the workpiece.

6. The gripper tooling of claim 1, further including a plurality of pulleys internally disposed within the base and the at least one middle segment, and each said pulley is configured for contacting the adducting tendon.

7. The gripper tooling of claim 1, wherein the adducting tendon is internally disposed within the base, the at least one middle segment, and the distal segment.

8. The gripper tooling of claim 1, wherein the at least one angular jaw includes a first angular jaw and a second angular jaw, the at least one rotor includes a first rotor and a second rotor, and the at least one tooling member includes a first tooling member and a second tooling member.

9. The gripper tooling of claim 8, wherein the first tooling member is in the form of a first finger and the second tooling member is in the form of a pair of second fingers having a common base and each second finger having a respective at least one middle segment, a distal segment, an abducting tendon, and an adducting tendon.

10. A method for gripping a workpiece, comprising the steps of:
  providing a gripper tooling including a gripper having a gripper body and at least one angular jaw moveably connected to, and thereby configured for rotating relative to, the gripper body, at least one rotor including a rotor body and a plurality of legs extending from the rotor body, the rotor body of the at least one rotor being fixedly connected to, and thereby configured for rotating with, the at least one angular jaw, and at least one tooling member configured for gripping the workpiece, each tooling member including a base pivotally connected to the plurality of legs of the at least one rotor, at least one middle segment pivotally connected to the base, a distal segment pivotally connected to the at least one middle segment, an adducting tendon having a proximal end attached to the rotor body of the at least one rotor and a distal end attached to the distal segment, and an abducting tendon having a proximal end attached to the base and a distal end attached directly to the distal segment, the plurality of legs of the at least one rotor being disposed—and thus housed—within the base, the abducting tendon having an absence of an assembly including a tendon and a linear spring attached to a distal end of the tendon;
  gripping the workpiece by the adducting tendon upon moving the base, by the at least one angular jaw, to be immobilized by the workpiece; and
  ungripping the workpiece by the abducting tendon upon moving the base, by the at least one angular jaw, away from the workpiece.

11. The method of claim 10, wherein in the step of gripping the workpiece, the base is configured to be immobilized by the workpiece and the at least one rotor is configured to rotate relative to the base toward the workpiece, thereby tensioning the adducting tendon and causing a rotation of the at least one middle segment and the distal segment, in a first direction, for gripping the workpiece, and the abducting tendon is stretched as the at least one middle segment and the distal segment rotate in the first direction, and in the step of ungripping the workpiece, the abducting tendon is configured for rotating the at least one middle segment and the distal segment in a second direction.

12. The method of claim 11, wherein the at least one tooling member is configured for autonomously gripping the workpiece as the at least one angular jaw rotates toward the workpiece and the at least one tooling member autonomously returns to an ungripped position as the at least one angular jaw rotates away from the workpiece, the abducting tendon having an absence of an assembly including a tendon and a linear spring attached to a distal end of the tendon.

* * * * *